United States Patent [19]

Motoyama et al.

[11] Patent Number: 5,499,329

[45] Date of Patent: * Mar. 12, 1996

[54] METHOD AND SYSTEM TO HANDLE CONTEXT OF INTERPRETATION IN A DOCUMENT PROCESSING LANGUAGE

[75] Inventors: Tetsuro Motoyama; Yueh-Lin Chang, both of San Jose, Calif.

[73] Assignees: Ricoh Company, Ltd., Tokyo, Japan; Ricoh Corporation, San Jose, Calif.

[*] Notice: The portion of the term of this patent subsequent to Jun. 6, 2012, has been disclaimed.

[21] Appl. No.: 87,571

[22] Filed: Jul. 2, 1993

Related U.S. Application Data

[63] Continuation-in-part of Ser. No. 931,808, Aug. 11, 1992, Pat. No. 5,416,896, which is a continuation-in-part of Ser. No. 876,601, Apr. 30, 1992, Pat. No. 5,319,748, and Ser. No. 876,251, Apr. 30, 1992, Pat. No. 5,325,484.

[51] Int. Cl.$^6$ .................................................. G06F 9/45
[52] U.S. Cl. ............................................................ 395/145
[58] Field of Search ................................. 395/145, 148, 395/162, 116; 364/419.07, 419.08, 419.11, 419.13, 419.12, 419.19

[56] References Cited

U.S. PATENT DOCUMENTS

| | | | |
|---|---|---|---|
| 5,033,008 | 7/1991 | Barker et al. | 395/148 |
| 5,086,504 | 2/1992 | Nemeth-Johannes et al. | 395/700 |
| 5,173,853 | 12/1992 | Kelly et al. | 395/148 X |
| 5,181,162 | 1/1993 | Smith et al. | 364/419.19 |
| 5,291,602 | 3/1994 | Barker et al. | 395/148 X |
| 5,299,304 | 3/1994 | Williams et al. | 395/148 |
| 5,319,748 | 6/1994 | Motoyama | 395/162 |
| 5,325,484 | 6/1994 | Motoyama | 395/162 |
| 5,353,222 | 10/1994 | Takise et al. | 364/419.17 |
| 5,357,629 | 10/1994 | Dinnis et al. | 364/419.08 X |
| 5,359,673 | 10/1994 | de La Beaujardiere | 364/419.08 X |
| 5,359,708 | 10/1994 | Bloomer et al. | 395/148 |
| 5,365,430 | 11/1994 | Jagadish | 364/419.08 |

OTHER PUBLICATIONS

Adobe, Postscript Language Reference Manual, 1985, pp. 7 to 54, 263 to 267.
Tennent, Principles of Programming Languages, 1981, pp. 15 to 21, 65 to 73, 95 to 146.
Wirth, Programming in Modula-2, 1985, pp. 47 to 56, 76 to 80.
ISO/IEC DIS 10180, Information Processing-Text Communication-Standard Page Description Language; Draft International Standard 1991-03, 1991.

*Primary Examiner*—Heather R. Herndon
*Assistant Examiner*—Anton W. Fetting
*Attorney, Agent, or Firm*—Oblon, Spivak, McClelland, Maier, & Neustadt

[57] ABSTRACT

A method and apparatus for processing the hierarchical structure of page description language. Each structure level of the document causes the creation of a prologue data structure which is used to keep track of system parameters. As content portions of the document are being processed, a current context of interpretation data structure is created which is also used to store parameters of the system. The prologue data structure and the current context of interpretation data structure contain pointers relating to context dictionaries, a user dictionary, and a state variable table. The dictionaries are kept track of by using a context stack made up by linked list data structures. It is possible to modify the search order of the context dictionaries by structure or content portions of the document and the linked list data structures keep track of whether the dictionaries were created using the content portions or structure portions.

12 Claims, 39 Drawing Sheets

DOCUMENT = PAGESET

DOCUMENT = ONE PAGE

Picture     :: = (prologue)?, (picture_body)?
Pageset     :: = (prologue)?, (pageset_body)?
Prologue    :: = (external_decl*, informative_decl*, resource_def*,
                  resource_decl*, doc_prod_instr_decl*,
                  context_decl*, dict_gen_decl*,
                  set_up_proc*)
picture_body :: = (picture | tokensequence)*
pageset_body :: = (pageset | picture)*

, ALL MUST OCCUR IN THE ORDER SHOWN
| ONE AND ONLY ONE MUST OCCUR
? OPTIONAL (0 or 1 TIME)
* OPTIONAL & REPEATABLE (0 or MORE TIMES)

*FIG. 3*

Pageset —50
- Prologue —51
    - Resource Definition —52
        - Tokensequence —53
    - Dictionary Generator —54
        - Tokensequence —55
    - Dictionary Generator —56
        - Tokensequence —57
    - Setup Procedure —58
        - Tokensequence —59
- PagesetBody —60
    - Picture —61
        - Prologue —62
            - Context Declaration —63
                - Dictionary Identifier —64
            - Dictionary Generator —65
                - Tokensequence —66
            - Setup Procedure —67
                - Tokensequence —68
        - PictureBody —69
            - Tokensequence —70
            - Picture —71
                - PictureBody —72
                    - Tokensequence —73
            - Tokensequence —74
    - Picture —75
        - PictureBody —76
            - Tokensequence —77

*FIG. 4*

SYSTEM DICTIONARY

| KEY | VALUE |
|---|---|
| SUB | THE PROCEDURE: POP TWO VALUES FROM THE OPERAND STACK, CHECK THEIR TYPES, ADD THEM, AND PUSH THE RESULT BACK INTO THE OPERAND STACK |
| SUB | THE PROCEDURE: POP TWO VALUES FROM THE OPERAND STACK, CHECK THEIR TYPES, SUBTRACT THEM, AND PUSH THE RESULT BACK INTO THE OPERAND STACK |
| . . . | |
| DICT | THE PROCEDURE: POP ONE VALUE FROM THE OPERAND STACK, CHECK THE TYPE TO BE INTEGER, CREATE AN EMPTY DICTIONARY WITH AN INITIAL CAPACITY OF THE INTEGER, AND PUSH THE CREATED DICTIONARY REFERENCE INTO THE OPERAND STACK |
| . . . | |
| EQ | THE PROCEDURE: POP TWO VALUES FROM THE OPERAND STACK, COMPARE THEM, PUSH TRUE IF THEY ARE EQUAL AND FALSE IF THEY ARE NOT EQUAL |
| . . . | |

*FIG. 12*

Context Dictionary Generator Data Structure

Context Stack Link Data Structure

User Dictionary

| Key | Value |
|-----|-------|
| add | {mul} |
|     |       |
|     |       |
|     |       |
|     |       |
|     |       |
|     |       |
|     |       |

*FIG. 23*

METHOD AND SYSTEM TO HANDLE CONTEXT OF INTERPRETATION IN A DOCUMENT PROCESSING LANGUAGE

CROSS-REFERENCES TO RELATED APPLICATIONS

This application is a continuation-in-part of U.S. patent application 07/931,808 now U.S. Pat. No. 5,416,896, filed on Aug. 11, 1992 and entitled "A Method And System to Handle Dictionary Generation and Context Declaration in a Document Processing Language" which is a continuation-in-part of U.S. patent applications 07/876,601 now U.S. Pat. No. 5,319,748 and 07/876,251 now U.S. Pat. No. 5,325,484 both filed on Apr. 30, 1992 and entitled "Method and Apparatus to Manage Picture and Pageset for Document Processing" and "Method and System to Handle Inclusion of External Files into a Document Processing Language," respectively.

BACKGROUND OF THE INVENTION

1. Field of the Invention

This invention relates generally to the computer control printing, displaying, or other presentation of documents which may have text, graphical components, and/or images. This invention is more particularly related to a method and system for processing the beginning and ending of pictures or pagesets in a document data stream, keeping track of the status of the presentation device referred to as the state of the virtual machine using a set of dictionaries, defined later, a context stack defining the search order of the dictionaries, a state variable table, a set of resources, and an operand stack.

2. Discussion of the Background

The development of laser printers in the early 1970s provided an opportunity for high quality, low cost printing of documents, which contained not only character text but also general graphical material. The primary method of controlling commands by the computer to the printer employed the so called "escape sequence" commands, similar to the type of commands used in the DIABLO® command sequence. These types of commands were distinguished from typical character data by preceding each command with a special byte, generally an escape character (ASCII 27). This methodology works acceptably with daisy wheel or dot matrix printers but is not well suited for printing documents that might have changing requirements. For example, as needs change and as technology improves, an upgrade of the presentation device is necessary. This type of upgrade in the past would have required removal of the program controller of conventional presentation devices. At a minimum, a new PROM containing instructions for the printer would be required. This is not a commercially acceptable way of handling temporary changes, as a new PROM would be installed for a few print jobs, and would then have to be replaced with the original PROM or another new PROM. This method of upgrade is wasteful and results in many failures of the presentation device controller.

As a response to the limitations inherent in the escape sequence commands, different types of "page description language" (PDL) were developed generally to control laser printers or other types of page printers. Backward compatibility of these laser printers was provided by way of an ability to accept escape sequence commands. Two current examples of page description language are the PostScript® system from Adobe Systems Incorporated and InterPress® from Xerox® Corporation. Several other proprietary PDLs are also known.

Some of the prior art page description languages provided various improvements to the standard escape sequences known previously, such as by providing tools and syntax for manipulation of objects, or by providing for the use of operand stacks or the like. Moreover, they are stack-oriented programming languages. These languages also allowed, in some cases, for dynamic changes in the printer's state, such as the ability to add fonts or graphical images to the resources that might be available to the printer. Some of these features are documented in such generally available reference works as Adobe System Incorporated's "PostScript Language Reference Manual" and the "PostScript Language Program Design," both by Addison-Wesley Publishing Company (1985 and 1988, respectively). Other PDLs are also described in various technical and reference books such as "InterPress, The Source Book" by Harrington et al. (Simon and Schuster, Inc., 1988)

A standardized page description language has been proposed and is being developed as an international standard by the International Organization for Standardization ("ISO"). The proposal, to which one of the present inventors is a contributor, is currently in draft form before a section of the ISO. The draft is known as ISO/IEC DIS 10180, labeled "Information Processing Text-Communication Standard Page Description Language" and is available through the American National Standards Institute("ANSI") in New York.

Many of the prior art types of page description languages suffer from various flaws. For example, one shortcoming of the PostScript® language is that a page description for a particular document can contain a new definition such as a resource definition (i.e. an additional font) or a new dictionary definition that can be used anywhere in the document. In other words, no structure is enforced in PostScript® and therefore, the entire content of the document must be processed to determine whether a particular printer has the resources necessary to print it. If this "preprocessing" is not performed, it is possible that the printing of a document may fail at any point during the printing process, even at the very end, due to the inability of the printer to comply with commands of the document page description.

Additional problems are associated with the prior art systems that employ PostScript®. For example, to print a given page of a document, it is generally necessary to read and process, before presenting a page, the entire PDL description of all the preceding pages of the document, in order to decide the state of the document page setup parameters (i.e., resource declarations, dictionary definitions or the like). In other words, a print controller program must read the entire PDL description of a document to consider the effect of every page setup command between the beginning of the document and the specified page. While this page setup scanning process is relatively straightforward, it does require a significant amount of processor time, which can be better used by the printer.

Additionally, there are no syntax or semantics defined in the PostScript® language to handle a structure, a prologue or a scope of a data declaration. There is a convention. This convention, however, does not need to be followed.

One problem with the well known InterPress® system from Xerox® is that its structure does not effectively handle dictionary definitions contained in an inputted data stream. Nor does InterPress® use the prologue structure in an expeditious manner. Also, the standard InterPress® encoding is only binary rather than clear text which a human can read.

SUMMARY OF THE INVENTION

Accordingly, one object of this invention is to provide a method and apparatus for the determination and efficient processing of hierarchical structure elements of a PDL document, such as the beginning and ending of pictures and/or pagesets in a document data stream so as to speed up the processing of document data streams.

It is another object of this invention to provide a method and apparatus which can keep track of the scope and status of material defined within the definition for each document data stream in an efficient manner.

It is a further object of this invention to provide an apparatus and methodology for selecting in an input data document stream a given page or picture for processing in an efficient manner without the requirement for processing all preceding pages in the document.

It is yet another object of the invention to create a current context of interpretation as the document is being processed which handles state variables and a "context stack" for keeping track of various dictionaries used for processing such as context dictionaries, content dictionaries, a user dictionary, and a system dictionary.

These and other objects are achieved according to the present invention by providing an efficient method of processing a page description language as defined in ISO/IEC DIS 10180, (hereinafter DIS 10180) for example. According to DIS 10180, as currently constituted, each document data stream is provided in a structure which is either a pageset or picture. The pageset and picture elements consist of an optional prologue which contains definitions and declatory commands and an optional body. A pageset body consists of zero or more pagesets or pictures while a picture body consists of zero or more pictures or tokensequences. The tokensequence which contains specific tokens or commands for defining specific images along with necessary operators contains "content" while other elements in the document are called "structure". The structure sets up the environment for content to generate the appropriate output images. The effects of a prologue within the hierarchical level of a picture or pageset is until the end of that picture or pageset. Therefore, the prologue of a picture in the hierarchical structure of a document does not influence those structures at the same or peer level or superior structures while influencing structures at a lower hierarchical level. This invention effectively handles this hierarchical tree structure along with the scope of the prologue by using a stack and various pointers.

A tree-linked hierarchical structure advantageously enables the processing of any portion of the document by directly addressing that portion of the document and those portions which are higher in the hierarchy without the necessity of processing any other items in different branches of the hierarchical tree. In other words, only structural definitions which occur in the hierarchical tree which are above a given portion of the document need be processed. This increases the efficiency of the processing of the document and also facilitates the determination of the type of resources which will be needed in the printing device or the display device prior to the commencement of the actual printing of the document. This increases the speed and efficiency by which various devices print or display the document.

Whenever a hierarchical level in a document is being processed, an entry is pushed into a picture/pageset stack corresponding to that hierarchical level. Each entry in the picture/pageset stack has a pointer to a prologue data structure and a pointer to a current context of interpretation (hereinafter called "CCI") data structure. The CCI data structure is used whenever content of a document is being processed. The entries in the CCI data structure can be modified when the structure of a document or file is being processed and can also be modified as content is being processed. However, content cannot directly modify the entries in the picture/pageset prologue data structure.

As a document is being processed, variables defining the state of the virtual machine which is performing the processing are defined in a state variable table. The state variables in a state variable table can be modified by the various processing commands.

A context stack is used to define the search order of four types of dictionaries used for processing the document. At the highest level in the context stack are context dictionary linked data structures which are used to define the search order of context and/or content dictionaries. The second level in the context stack pertains to the user dictionary. User dictionary link data structures are used to search the different entries at the different hierarchical levels of the user dictionary. Last, there is one system dictionary which is usually in the same location and the system dictionary is searched if the key being searched is for is not found in either of the context or user dictionaries.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is an illustration of the "grammar" of a picture, pageset, prologue, picture_body and a pageset_body;

FIG. 4 illustrates the structure of an exemplary two page SPDL document;

FIG. 10A handles the manipulation of the picture/pageset stack and the picture/pageset prologue data structure and FIG. 10B handles the processing of the state variables;

FIG. 12 illustrates a part of the system dictionary;

FIG. 23 is an example of a user dictionary containing one entry;

DETAILED DESCRIPTION OF THE DRAWINGS

Figure 1A:
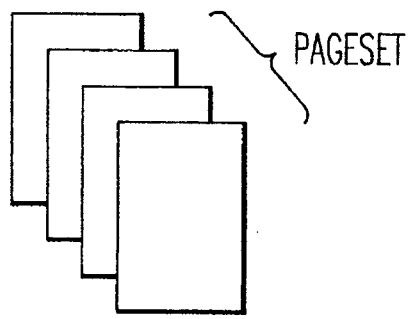
FIG. 1A and 1B are illustrations of sample documents and their hierarchical structural elements.
Figure 1B:
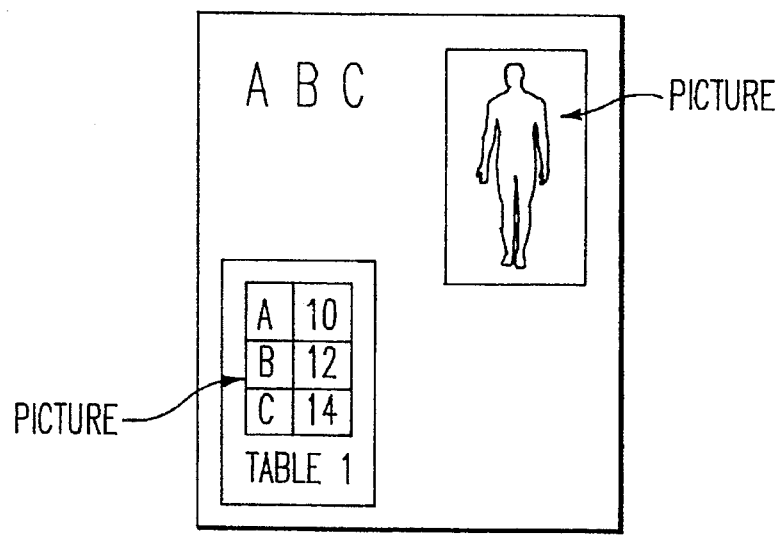

Referring now to the drawings, wherein like reference numerals designate identical or corresponding parts throughout the several views, and more particularly to FIGS. 1A and 1B thereof, there are illustrated two documents and their structural elements such as pictures and pagesets as defined in the Standard Page Description Language ("SPDL"). In SPDL, a document can be defined as a single picture or a single pageset. A pageset can consist of additional pagesets or pictures. A picture cannot be greater than one page and cannot cross from one page to another. FIG. 1A illustrates a document consisting of one pageset with four pages (the highest level of pictures). FIG. 1B illustrates a single page document containing text and two pictures. The document of FIG. 1B could be represented as either a pageset of one page or a picture as it is only one page.

Figure 2:
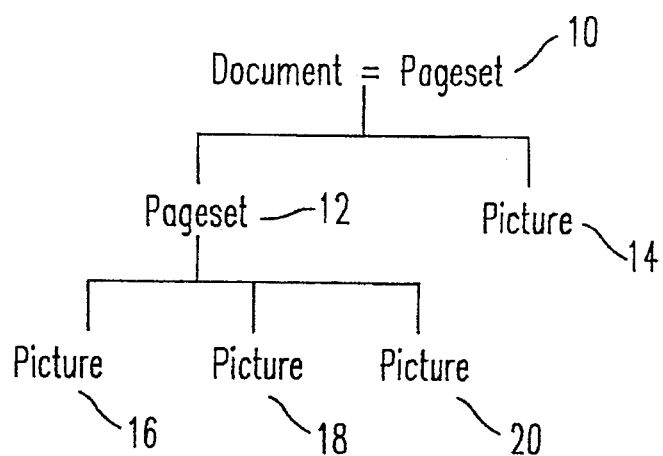
FIG. 2 is an illustration of the hierarchical structure of a document.

FIG. 2 is an illustration of the hierarchical structure of an SPDL document. The document illustrated in FIG. 2 contains a pageset 10 as its highest hierarchical structural element. Pageset 10 consists of pageset 12 and picture 14. Pageset 12 further consists of the pictures 16, 18, and 20. To define hierarchical levels by way of example, pageset 12 is at a lower hierarchical level than pageset 10 but at a higher hierarchical than the pictures (pages) 16, 18, or 20. Each hierarchical element will usually consist of a lower level hierarchical element and/or one or more tokensequence elements. A tokensequence is a special type of structural element which contains content. Content is the substance of what is printed or displayed for a document. A tokensequence, for example, may describe a drawing, text or image. The representation of content such as a drawing, text, or image by way of tokensequences allows for a very rapid and efficient processing of a document for presentation, especially when only a portion of a document is to be presented because the tokensequences of pages which are not to be presented do not have to be processed. Pictures 14, 16, 18 and 20 each will probably have at least one tokensequence element.

As shown in FIG. 3, a picture and pageset have a set "grammar". A picture is defined as having an optional prologue and an optional picturebody, and a pageset is defined as having an optional prologue and an optional pageset body. The optional prologue defines various parameters used by a processing system to process a document and contains elements such as an external declaration, informative declaration, resource definition, resource declaration, document production instruction declaration, context declaration, dictionary generation declaration or set-up procedure. All of these elements in the prologue are optional and, in fact, may be repeated in the sense that there may be multiple instances of the same item. Consequently, multiple levels of a prologue may be present and the handling of these multiple instances can be accomplished as set forth below.

FIG. 4 is a detailed illustration of the structure elements of a sample two page document. The document consists of one pageset 50 having a prologue 51 and a pagesetbody 60. As discussed with regard to FIG. 3, a prologue is an optional structural element which defines various parameters for the picture or pageset. The prologue 51 contains four subordinates; resource definition 52, dictionary generator 54, dictionary generator 56, and setup procedure 58, and corresponding tokensequences. The resource definition 52 is a structural element which indicates tokensequence 53 contains the content which defines resources used for presentation (e.g., the definition of a form used by a document).

The dictionary generator 54 indicates that tokensequence 55 defines a dictionary. Similarly, dictionary generator 56 indicates that tokensequence 57 defines a dictionary. A dictionary definition contains ordered pairs consisting of a key and a value. Whenever a key is encountered in content, the value from a dictionary corresponding to the key is substituted therefor. The value entry in a dictionary can be an integer number, a real number, procedure or any other type of value. Dictionaries created by dictionary generators are made read only and are created to be context dictionaries, as explained below.

The setup procedure 58 initializes various state variables which are used when processing content. Exemplary state variables are variables such as Current_Color, Current_Font and Current_Position. The setup procedure is also used to alter the contents of the user dictionary, if desired. The user dictionary is a read/write dictionary which is searched after the context and content dictionaries are searched without encountering the searched key.

Pageset body 60 contains two pages having pictures 61 and 75. Picture 61 has its own prologue 62 which defines parameters only for the picture 61 and does not affect picture 75. Prologue 62 contains context declaration 63 and its dictionary identifier 64, dictionary generator 65 its tokensequence 66, setup procedure 67, and its tokensequence 68. The picturebody 69 of picture 61 contains tokensequences 70 and 74, and picture 71 having picturebody 72 and tokensequence 73. The second page of the document has picture 75 with picturebody 76 having tokensequence 77.

The context declaration 63 indicates a manipulation of context dictionaries which are defined in higher hierarchical levels of the structure. If a dictionary identifier such as dictionary identifier 64 follows a context declaration, the dictionary identifier will indicate how the search order of the context dictionaries are to be changed. If a dictionary identifier element does not follow the context declaration, any defined search order of the dictionaries will be eliminated, no context dictionaries will be searched for the particular hierarchical level, and the user dictionary and the system dictionary will be placed in the bottom of the context stack. The search order of the dictionaries is defined using context dictionary stack data structures, as will be explained in detail below.

It should be understood that FIG. 4 illustrates only an abstract description of the structure of an SPDL document and an actual SPDL document might use a different description.

Figure 5:
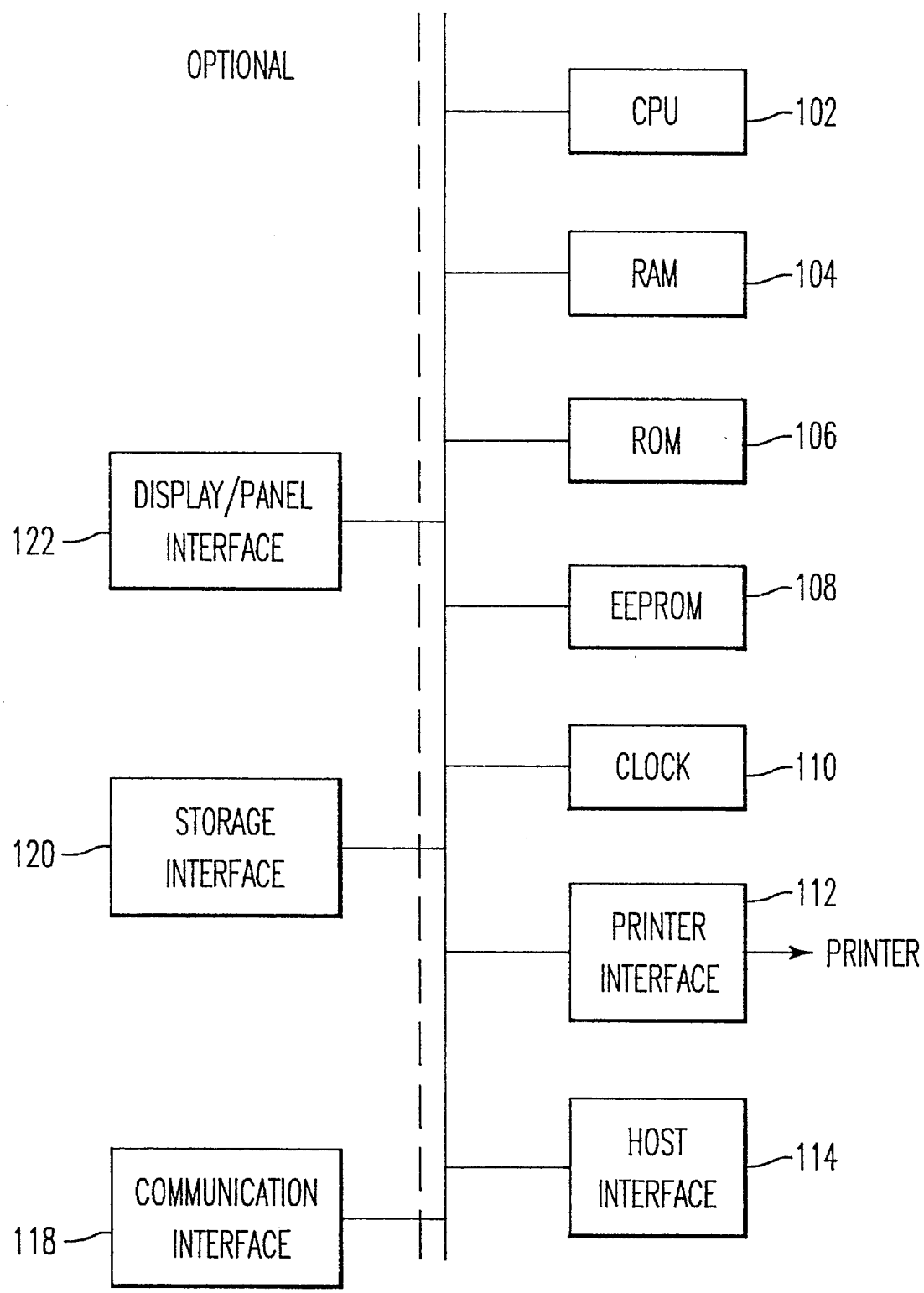
FIG. 5, is an illustration of a sample hardware embodiment which can employ the present invention.

Turning now to an exemplary hardware implementation of the present invention illustrated in FIG. 5, a system will generally have at least a CPU 102, memory generally in the form of ROM 106 and RAM 104, input/output means to receive the document data stream, and a means for displaying/printing a resultant output. The resultant output image may be produced by an image raster device which may be directly connected to the CPU or may have its own distinct native type of imaging which would then, of course, require a translation of a document data steam into the type of imaging commands which the individual imaging device might have. An example of this might be a PostScript® type of device connected to a system which transmits the document description data stream, as called for in this invention, and which then processes and prints the data after a translation into PostScript® language. This, of course, allows for means of supporting existing printers.

Figure 6:
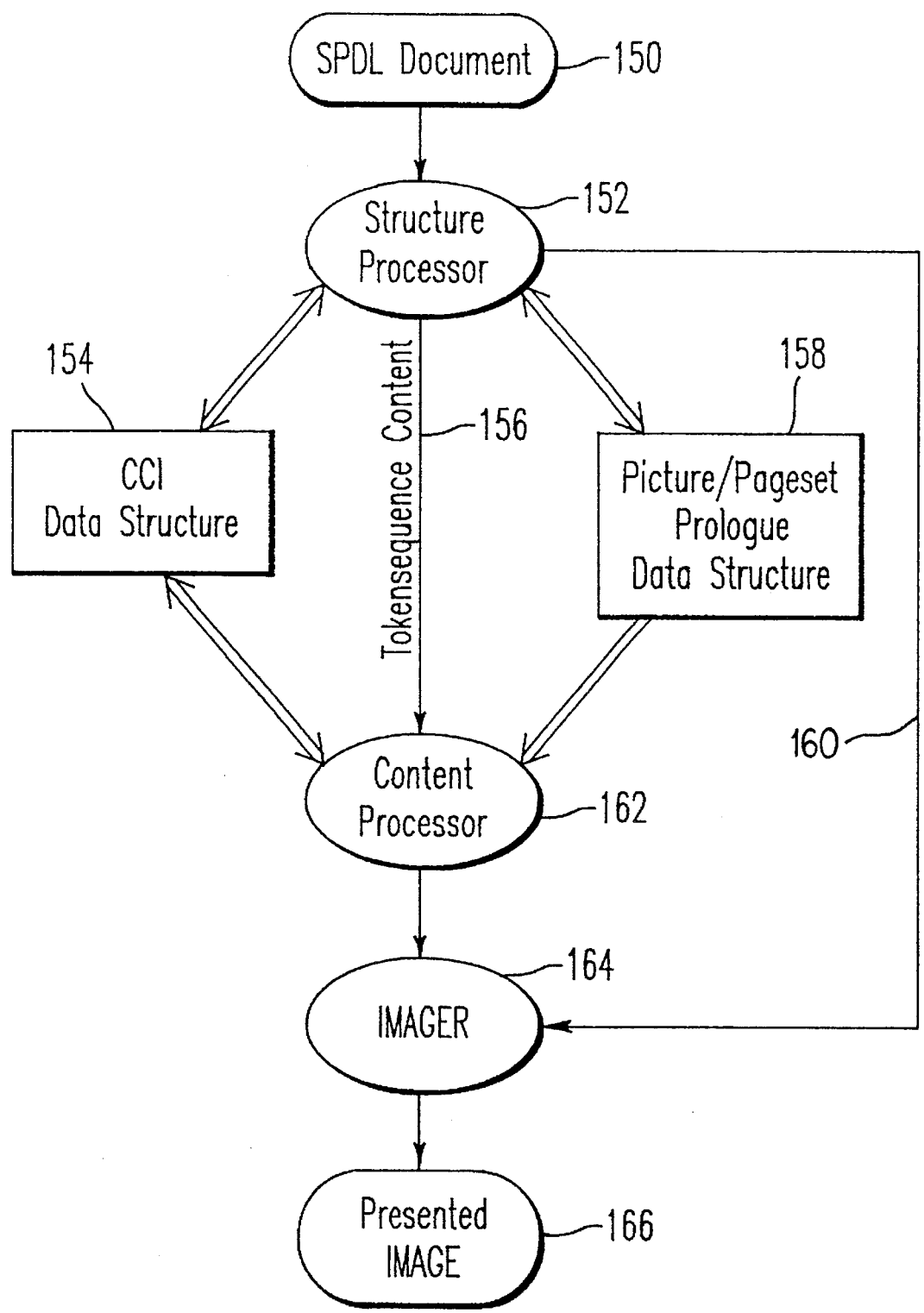
FIG. 6 is an illustration of the virtual machine or processing model used to process SPDL documents.

As previously discussed, a document contains structure and content. FIG. 6 is an illustration of a system for processing the structure and content of an SPDL document into a presented image. While a document can be processed using a single processor such as CPU 102 of FIG. 5, the illustration of FIG. 6 contains separate structure processor 152, content processor 162, and imager 164 for combining the processed structure and content into a presented image 166. The processing model illustrated in FIG. 6 will hereinafter be referred to as the virtual machine.

Examining the elements of FIG. 6, an SPDL document 150, created by a word processor or a page description generator, for example, is interpreted by the structure processor 152 after being parsed by a known conventional parsing processes. The parsing process is not described in detail herein for brevity. When a tokensequence, a structure element containing content, is processed by the structure processor 152, the content of the tokensequence is sent along a line 156 to the content processor 162. Note that if the entire SPDL document is not to be presented but only certain pages are desired to be presented, the content of the tokensequences of the pages which are not to be presented are not transmitted to the content processor 162. This advantageously reduces the processing time over prior art systems.

When the content processor 162 is processing content, it is necessary for it to know various parameters defined by the structure of the document. To accomplish this, the structure and content processor have access to a CCI data structure 154 and a picture/pageset prologue data structure 158. The CCI data structure 154 is a structure through which the structure and content processors communicate. The CCI data structure exists as a structure element containing content is being processed. Once the processing of the hierarchical level of the structure element is complete, in general, the information in the CCI data structure is returned to the structure processor and the CCI data structure is deleted or saved by the structure processor. For example in FIG. 4, prologue 51 contains tokensequence elements 53, 55, 57 and 59. Whenever a tokensequence is processed, a CCI data structure is created. When the tokensequence being processed ends, the information which has been placed in the CCI data structure is returned and the information is connected to the picture/pageset prologue data structure.

The current context of interpretation consists of a set of available resources and the state of the virtual machine. The set of available resources is the set of resources which may be used in processing a particular content element. The state of the virtual machine is a context stack, an operand stack, and state variables. These elements making up the state of the virtual machine will be explained in detail below.

When text or image content is being processed by content processor 162, the processed document content and the print instruction from the structure processor 152 through line 160, are combined in an imager 164 which outputs a presented image 166.

While the processing model of FIG. 6 illustrates only one CCI data structure and one picture/pageset prologue data structure, each level of structure actually has its own CCI data structure and picture/pageset prologue data structure. To keep track of the different levels of structure, a stack such as stack 202, illustrated in FIG. 7 is used.

A bottom entry 210 in the stack exists whenever a document is being processed. The pointer to CCI data structure 214 initially points to null as no tokensequence element containing content has yet been encountered and therefore there is no need for a current context of interpretation. A CCI data structure is used only when content of a tokensequence element is being processed and is used as a communication link between the structure processor and content processor. The pointer to prologue data structure 212 of the bottom stack entry 210 points to default values of the picture/pageset prologue data structure until the values in the prologue data structure are changed by elements within a document.

The elements within an SPDL document are initially processed by a parser 200. The parser 200 accepts a data stream from an SPDL document and identifies various structure elements within the data stream. The tokens Picture_begin, Picture_end, Pageset_begin and Pageset_end indicate a change in hierarchical structure level. When these structure elements are recognized by the parser 200, the parser will call an appropriate routine to handle the processing of the data stream. A conventional type of either hardware, software or combination parsing may be used. The parser 200 for example could be implemented in CPU 102 of FIG. 5. It could also be part of structure processor 152 of FIG. 6. The parsing further could be performed by a separate processor, for example. For the sake of brevity, no further discussion of the mechanism for parsing is made.

Figure 7:
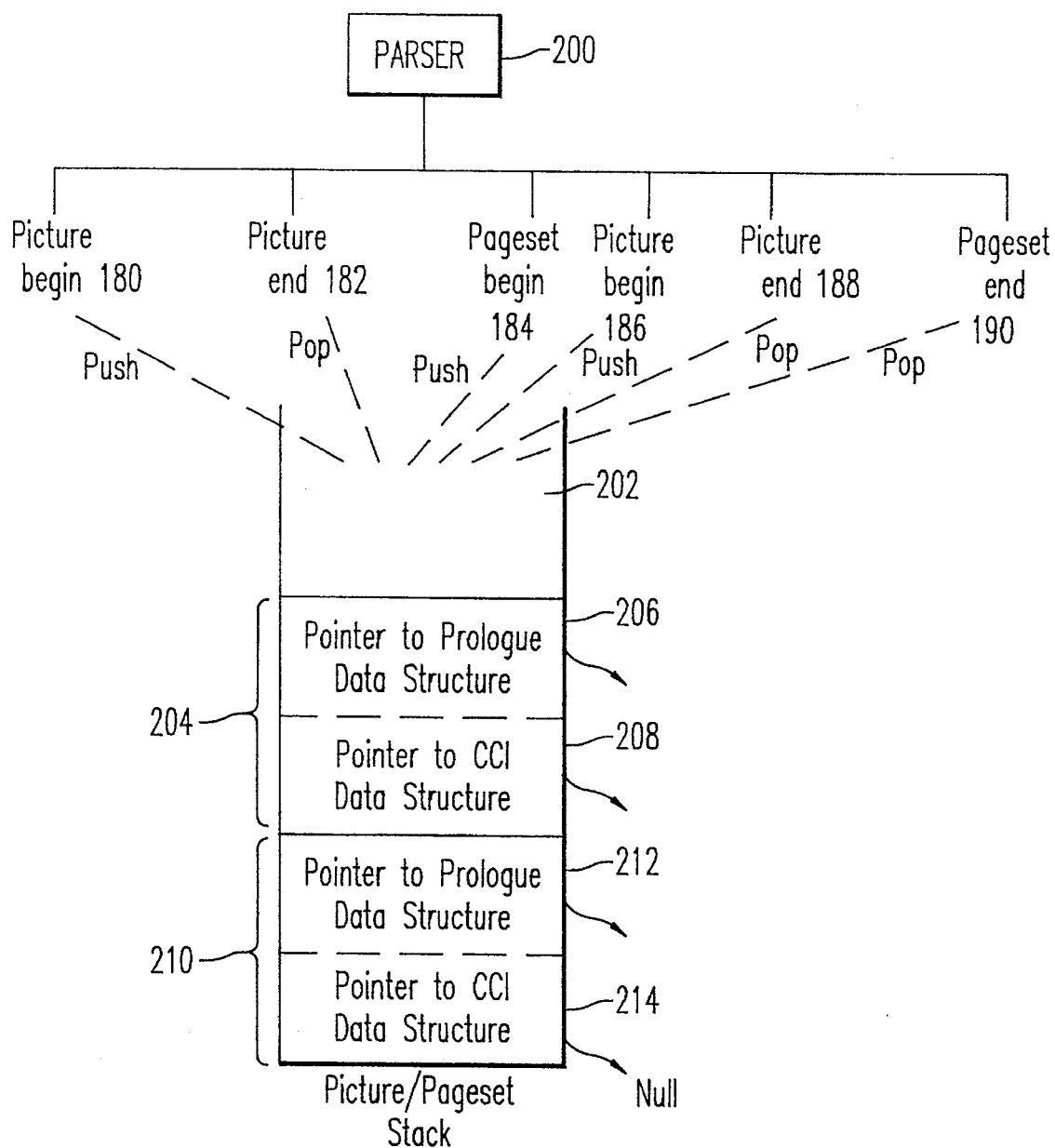
FIG. 7 is an illustration of the picture/pageset stack and various hierarchical structure elements which push or pop entries onto the stack.

Elements 180–190 of FIG. 7 illustrate various hierarchical structural elements of a single SPDL document. The structural elements are for illustrative purposes only and show a simplified version of a document. An actual SPDL document would probably contain tokensequences as well as other structure elements. Before processing of the document containing elements 180–190 begins, the picture/pageset stack 202 is empty. When the document is being processed and a picture begin 180 is encountered, one entry is pushed onto the picture/pageset stack 202 containing a pointer to a prologue data structure and a pointer to a CCI data structure. When a picture end 182 is encountered, that one entry on the stack 202 is popped off. The picture/pageset stack 202 will then be again empty.

Next, a pageset begin 184 is encountered. An entry 210 is pushed onto the picture/pageset stack containing a pointer to a prologue data structure 212 and a pointer to CCI data structure 214. If content from a tokensequence is encountered which is on the level of a pageset begin, the pointer to CCI data structure 214 will be changed from pointing to null to pointing to a CCI data structure created in response to the tokensequence. After the pageset begin 184, a picture begin 186 is encountered. An entry 204 is pushed on top of the stack 202 above the entry 210. Entry 204 contains pointer to prologue data structure 206 and a pointer to CCI data structure 206. After the picture corresponding to picture 186 has ended, picture end 188 pops off entry 204 from the stack 202. Remaining in the stack, and now the only entry, is entry 210. A pageset end 190 pops the entry 210 off of the stack 202.

For purposes of simplicity, reference numeral 202 will always refer to the picture/pageset stack for every document, the highest hierarchical structural element will correspond to entry 210 on the picture/pageset stack 202, and element 204 will correspond to any second hierarchical level of any document.

In an actual clear text encoding of an SPDL document, the structure terms could be denoted as <picture> and <pageset> for a beginning while </picture> and </pageset> may be used to denote an ending. Clear text encoding in SPDL follows the Standard Generalized Markup Language ("SGML"), as defined in ISO document 8879:1986, incorporated herein by reference. Alternatively, an SPDL document can be represented in binary form as opposed to the clear text form and a binary encoding scheme for the document data streams could use special tags along with a byte count to identify a begin and end condition for a picture and pageset. A binary SPDL document is encoded according to Abstract Syntax Notation One ("ASN.1") as defined in ISO/IEC document 8824:1990 and follows the Basic Encoding Rules, as defined in ISO/IEC 8825:1990 both of which are incorporated by reference herein.

Figure 8:
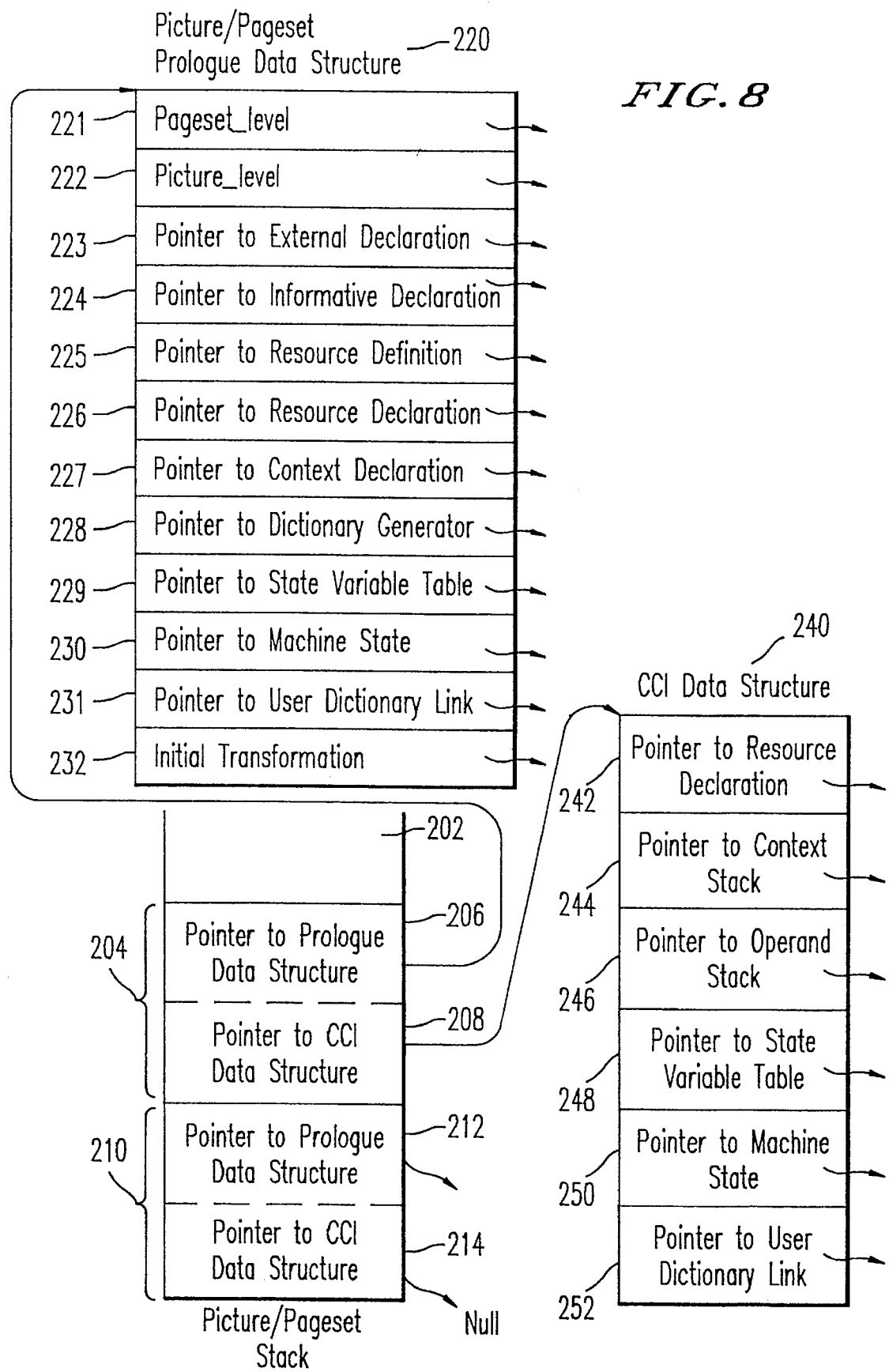
FIG. 8 is an illustration of the picture/pageset stack and the picture/pageset prologue data structure and CCI data structure pointed to by the entries in the picture/pageset stack.

FIG. 8 illustrates the picture/pageset stack 202 of FIG. 7 and the data structures pointed to by pointer to prologue data structure 206 and the pointer to CCI data structure 208. The picture/pageset prologue data structure 220 and the CCI data structure 240 correspond to the picture/pageset prologue data structure 158 and CCI data structure 154 illustrated in FIG. 6.

Examining the contents of the picture/pageset prologue data structure 220, a given pageset level in the hierarchical structure is stored in entry 221 and a given picture level is stored in a picture level entry 222. A series of pointers 223, 224, 225, 226, 227, 228, 229, 230 and 231 identify various items such as a pointer to an external declaration 223, a pointer to a informative declaration 224, a pointer to a resource definition 225, a pointer to a resource declaration 226, a pointer to a context declaration 227, a pointer to dictionary generator 228, a pointer to a state variable table 229, a pointer to a machine state 230, and a pointer to a user dictionary link 231. Item 232 of picture/pageset prologue data structure 220 contains an initial transformation in the coordinate system.

The CCI data structure 240 pointed to by a pointer to CCI data structure 208 of a stack element 204, created during the processing of a tokensequence element, contains various parameters used by the content and structure processor as a document is being processed for presentation. The elements in CCI data structure 240 include a pointer to resource declaration 242, a pointer to a context stack 244, a pointer to an operand stack 246, a pointer to a state variable table 248, a pointer to a machine state 250, and a pointer to a user dictionary link data structure 252. The CCI data structures created for processing can be considered temporary data structures as they are created upon first encountering a content portion (i.e., tokensequence element), and are destroyed when a tokensequence ends and the hierarchical structure element of the tokensequence ends.

Figure 9:
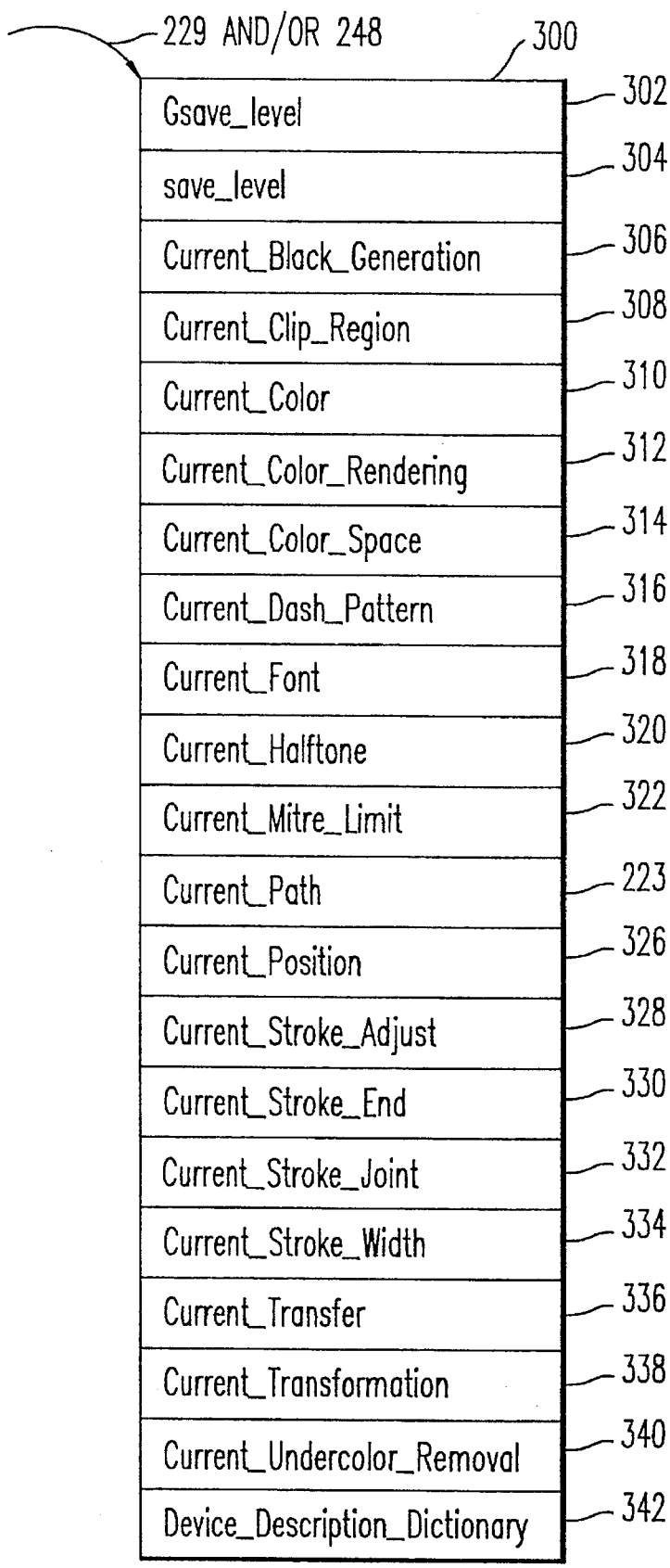
FIG. 9 is an illustration of a state variable table.

FIG. 9 illustrates an exemplary state variable table 300 which can be pointed to by pointer 248 of the CCI data structure and/or pointer 229 of the picture/pageset prologue data structure. The state variables in this table are used to define various parameters used for the processing of content. Actual implementations of the present invention may likely contain more state variables than those state variables illustrated in the state variable table of FIG. 9.

Figure 10A:
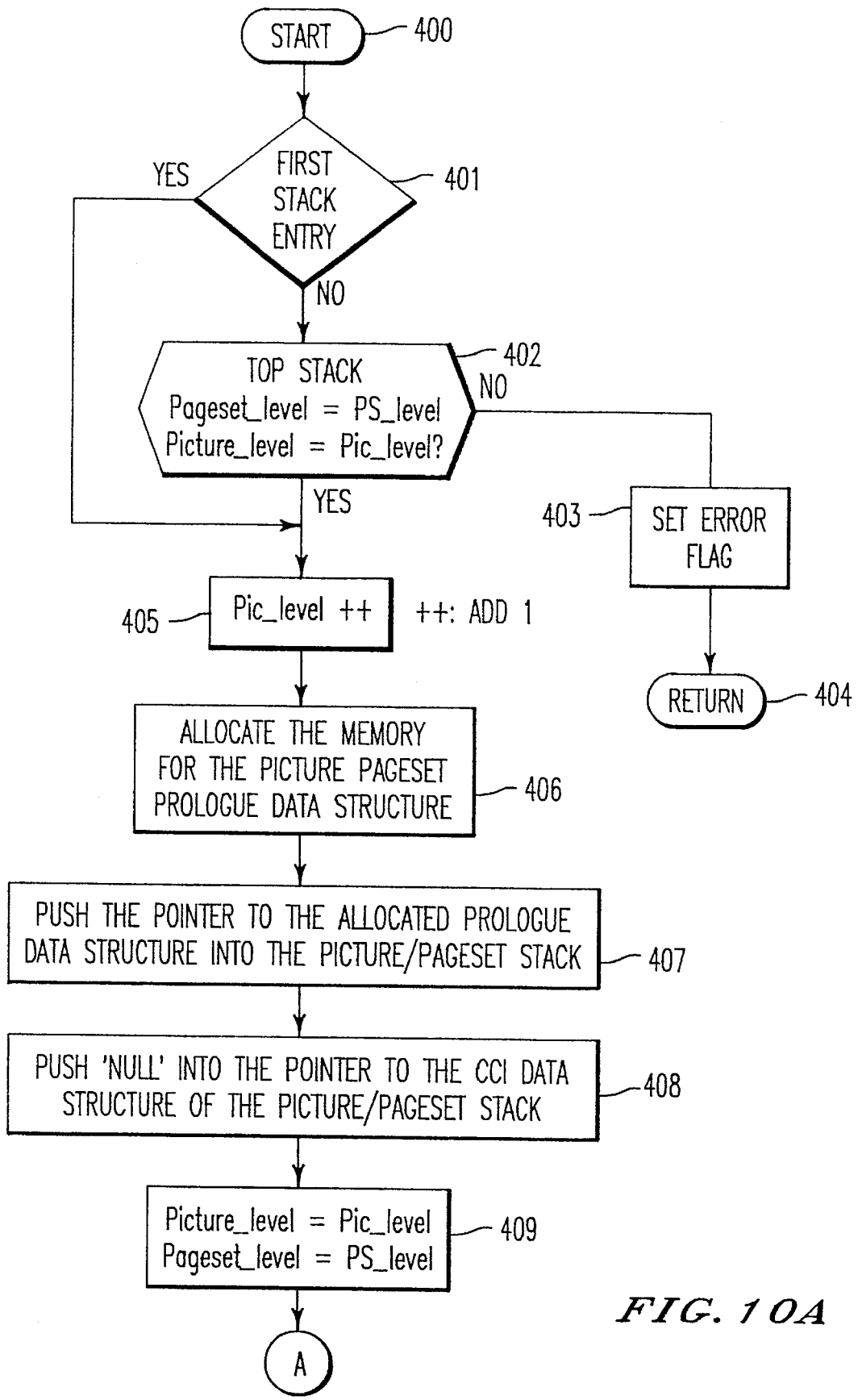
FIGS. 10A and 10B illustrate a process performed at a "picture_begin" command.
Figure 10B:
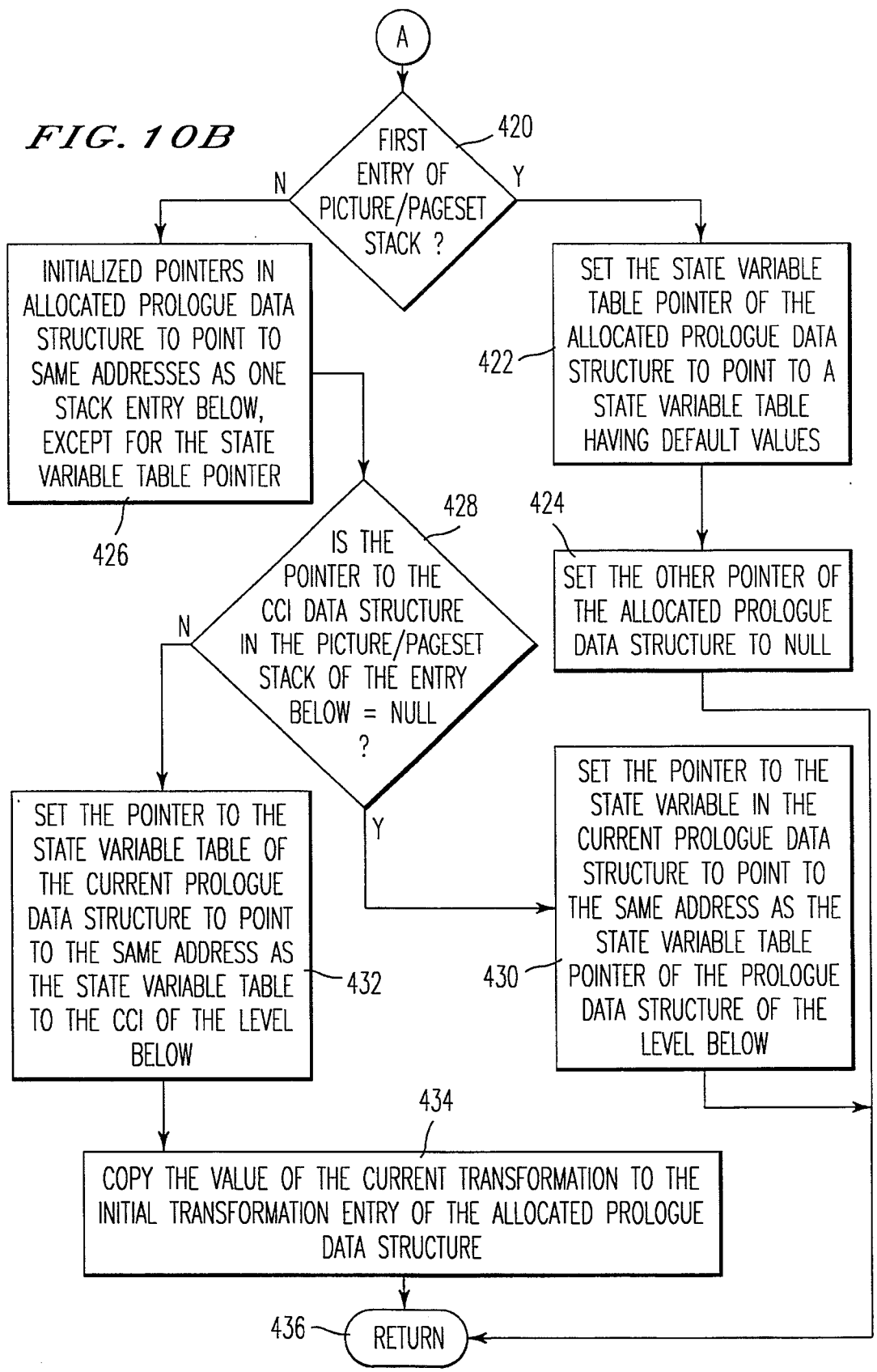

Turning now to the details of processing a document, FIGS. 10A and 10B illustrate the steps which take place when the beginning of a picture in an SPDL document is encountered. FIG. 10A handles defining the picture/pageset prologue data structure while FIG. 10B handles the processing of state variables. Global variables such as the picture level (Pic_level) and pageset level (PS_level) are available for use by any of the routines while the variables Picture_level 222 and the Pageset_level 221 are local variables contained within the prologue data structure 220 pointed to by entry 206 in the picture/pageset stack 202 found in FIG. 8. The routine of FIGS. 10A and 10B would be executed, for example, when picture 61, picture 71, or picture 75 of the document illustrated in FIG. 4 are encountered during processing.

The Pic_level is initialized to zero at the initialization of the processing for a new document data stream or on "power up". If step 401 determines that the hierarchical level being processed is not the highest hierarchical level (i.e., at the beginning of processing and where all higher levels have already been processed), flow proceeds to step 402 where an error check occurs. An error flag is set in step 403 if any problems occur, followed by a return to other processing by the CPU 102 of FIG. 5 in step 404. Otherwise, processing continues and the global variable Pic_level is incremented at step 405.

When selection of pages is needed, the following process would be inserted after step 405. If (Pic_level==1) then page-number is incremented. This means, after step 405, that Pic_level is examined to see if it is one. If it is one, then the "picture begin" denotes the beginning of the highest level of picture hierarchy, that is, the start of a page. Therefore the page-number is incremented. "Page-number" is initialized as zero at power on initialization or upon a reset of the processing system. The "Page-number" ideally should be a global variable which can be accessed by any routine. As the Pic_level is a global variable, the level number is to through all other routines and allows for multiple levels to be implemented.

An allocation of memory occurs in step 406 for the picture/pageset prologue data structure 220 of FIG. 8. A pointer to the address of the picture/pageset prologue data structure is pushed on the stack 202 in step 407. In step 408, as a tokensequence has not yet been encountered and therefore, a CCI data structure for the picture begin being processed does not exist, null is pushed into the pointer to the CCI data structure of the picture/pageset stack. The Picture_level and the Pageset_level of the prologue data structure 220 are set in step 409. Flow then proceeds to the flowchart illustrated in FIG. 10B for processing of entries in the prologue data structure and state variable processing.

The first step of FIG. 10B, step 420, examines whether the picture begin which is being processed is the first entry of the picture/pageset stack. If it is, flow proceeds to step 422 where the state variable table pointer of the allocated prologue data structure is set to point to a default state variable table. This step is performed as the first hierarchical level is being processed and therefore, there are no state variables which have been previously modified which need to be used. In step 424, all of the pointers in the allocated prologue data structure are set to point to null except for the previously defined state variable pointer.

If step 420 determines that the entry being processed is not the first entry of the picture/pageset stack, flow proceeds to step 426 where the pointers in the allocated prologue data structure point to the same addresses as the prologue data structure of one picture/pageset stack entry below, except for the state variable table pointer. Note that the stack entry below corresponds to the above hierarchical level as lower hierarchical levels are pushed onto the top of the picture/pageset stack. Flow proceeds to step 428 where the pointer to the CCI data structure of the picture/pageset stack of the entry below is examined to see if it is set to null. If it is, flow proceeds to step 430 where the pointer to the state variable table in the current prologue data structure is set to point to the same address as the state variable table pointer of the prologue data structure of one stack level below. If step 428 determines that the pointer to the CCI data structure of the entry below in the picture/pageset stack is not equal to null, the pointer to the state variable table of the current prologue data structure is set to point to the same address as the state variable table of the CCI data structure of the level below.

From step 432, flow proceeds to step 434 where the value of the current transformation is copied to the initial transformation entry of the allocated prologue data structure. In step 436, the picture begin process is completed and flow returns to the structure processor for further processing of the document.

The processing that occurs for a pageset begin is similar to that illustrated for a picture begin in FIGS. 10A and 10B, except for some minor changes. These changes would include, for example, instead of determining if picture_level is equal to the Pic_level, both the picture_level and the Pic_level must both be zero. Further, step 405 is changed so that the PS_level is incremented instead of the Pic_level being incremented. The process illustrated in FIG. 10B can be identically performed for a pageset begin.

Figure 11:
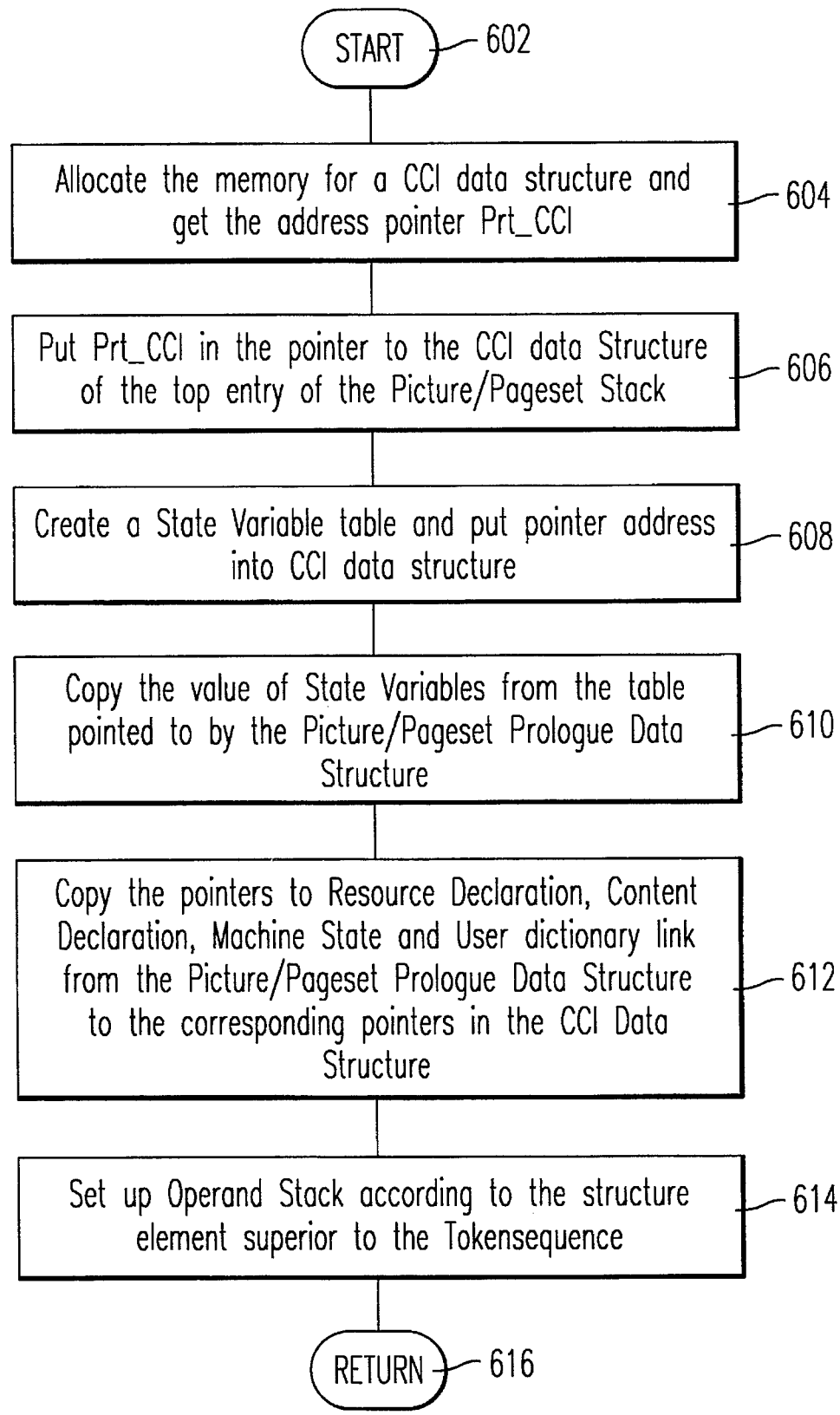
FIG. 11 illustrates a process used to create a current context of interpretation data structure upon encountering a tokensequence structure element.

FIG. 11 illustrates a flow chart of the process used to create a CCI data structure when a tokensequence is encountered and there is not a hierarchical level of the document immediately above with a CCI data structure. The process illustrated in FIG. 11 for the creation of the CCI data structure would occur, for example, when tokensequences 53, 55, 57, 59, 66, 68, 70, 73 and 77 of the document illustrated in FIG. 4 are processed. Step 74 does not create a CCI data structure because it uses the CCI data structure created by step 70.

To create the CCI data structure when a tokensequence element is encountered and the pointer to CCI for the top entry of the picture/pageset stack points to null, the structure processor calls step 602 of FIG. 11. Step 604 allocates memory for a new CCI data structure such as the CCI data structure 240 illustrated in FIG. 8. The address of the created data structure 240 is stored as the address pointer PTR_CCI and step 606 puts the pointer PTR_CCI into the pointer to CCI data structure, for example into location 208 of the picture/pageset stack 202 of FIG. 8. Step 608 creates a state variable table for the CCI data structure and puts the address of the state variable table into the pointer to state variable table, for example, 248 of CCI data structure 240. Next, the values of the state variable table pointed by the pointer to state variable table 229 of the picture/pageset prologue data structure 220 are copied from the pointed table of the picture/pageset prologue data structure to the pointed state variable table of the CCI data structure in step 610.

Step 612 assigns the values of the various pointers in the CCI data structure 240 from corresponding entries in picture/pageset prologue data structure 220. This includes copying the pointer to resource declaration 226 to pointer 242 of the CCI data structure, copying the pointer to context declaration 227 to 244 of the CCI data structure, copying the pointer to the machine state 230 to the pointer to machine state 250 of the CCI data structure, and copying the pointer to user dictionary link 231 to pointer 252 of the CCI data structure.

Last, step 614 constructs an appropriate operand stack based upon the superior structure element to the tokensequence. This step may include writing the null pointer to operand stack 246 of the CCI data structure or other pointer values. Flow then returns to the structure processor in step 616.

The process illustrated in the flowchart of FIG. 11 assumes that when a tokensequence ends, the values from the CCI data structure are copied into the picture/pageset prologue data structure, if necessary. However, it is possible that a tokensequence, such as tokensequence 70 of FIG. 4, does not have the CCI data structure destroyed when the hierarchical level of the document drops one level, such as upon encountering picture 71.

In this case, Picture 71 would cause the process illustrated in FIGS. 10A and 10B to be executed. When step 428 of FIG. 10B is reached, the pointer in the CCI data structure in the picture/pageset stack for the entry below the top entry is determined not to be null as the CCI data structure for the tokensequence 70 was not destroyed. Therefore, step 432 is executed which sets the pointer to the state variable table in the new prologue data structure to be equal to the pointer to the state variable table of the CCI data structure for the stack entry below. Consequently, if there happens to be a modification of state variables by any element after tokensequence 70 but before tokensequence 74, the state variable created for picture 71 will be modified and the state variable table used when processing tokensequence 70 will not be modified.

Turning back to FIG. 4 for examples of the creation of the different levels of the picture pageset stack pointing to the picture/pageset prologue data structure and the CCI data structures for the levels, when pageset 50 of FIG. 4 is encountered, processes for pagesets, similar to those for pictures illustrated in FIGS. 10A and 10B are called, and a first entry is pushed onto the picture/pageset stack, corresponding to entry 210 in the picture/pageset stack 202 of FIG. 8. The resource definition 52 contains tokensequence 53 which causes the creation of CCI data structure which will be pointed to by pointer 214. When tokensequence 53 ends, the pointer to CCI data structure 214 will be set to point to null and the CCI data structure will be destroyed after the structure processor takes the necessary information. Similarly, when tokensequences 55 and 59 are encountered, a CCI data structure will be created for each tokensequence and destroyed at the end of the tokensequences after the structure processor takes the necessary information.

For the setup procedures 58 and 67, the structure processor takes the state variable table of the returned CCI and replaces the pointer to state variable table in the prologue data structure with the pointer to the state variable table which is returned. An illustration of the manipulation of the relevant data structure used to keep track of the state variables is described with respect to FIG. 28A–28E.

When picture 61 is encountered, which is a lower hierarchical level, an entry 204 is pushed onto the picture/pageset stack 202. A CCI data structure is created as tokensequence 66 is being processed and destroyed at the end of tokensequence 66 after the structure processor takes the necessary information. A similar processing occurs for tokensequence 68.

Tokensequence 70, like other tokensequences, causes the creation of a CCI data structure. However, because there is a picture 71 below the tokensequence 70, the CCI data structure corresponding to the tokensequence 70 is not destroyed at the end of the processing of tokensequence 70 but remains in memory. Picture 71 causes the creation of a third hierarchical level and a third entry is pushed onto the picture/pageset stack 202. Tokensequence 73 causes the creation of a CCI data structure for the third entry of the picture/pageset stack. When tokensequence 73 ends, the CCI data structure for the third entry is destroyed and the hierarchical level changes back to the second level corresponding to picture 61. Therefore, the CCI data structure originally created for tokensequence 70 is again used for tokensequence 74. When tokensequence 74 ends, the corresponding CCI data structure is destroyed. Also, when tokensequence 74 ends, there is an end to picture 61 and the second entry of the picture/pageset stack is popped off.

Picture 75 is at the second hierarchical level and causes a new second entry to be placed onto the picture/pageset stack. Tokensequence 77 causes a CCI data structure to be created for the second entry on the stack and the end of tokensequence 77 is the end of the document and all CCI data structures are destroyed and entries on the picture/pageset stack are popped off as the document has ended.

When a tokensequence ends, it is usually necessary to delete its CCI data structure and perform various pointer manipulations. Before a description of how a CCI data structure, such as CCI data structure 240 of FIG. 8, is deleted, a detailed description of the handling of the various types of dictionaries will be given.

Figure 23:
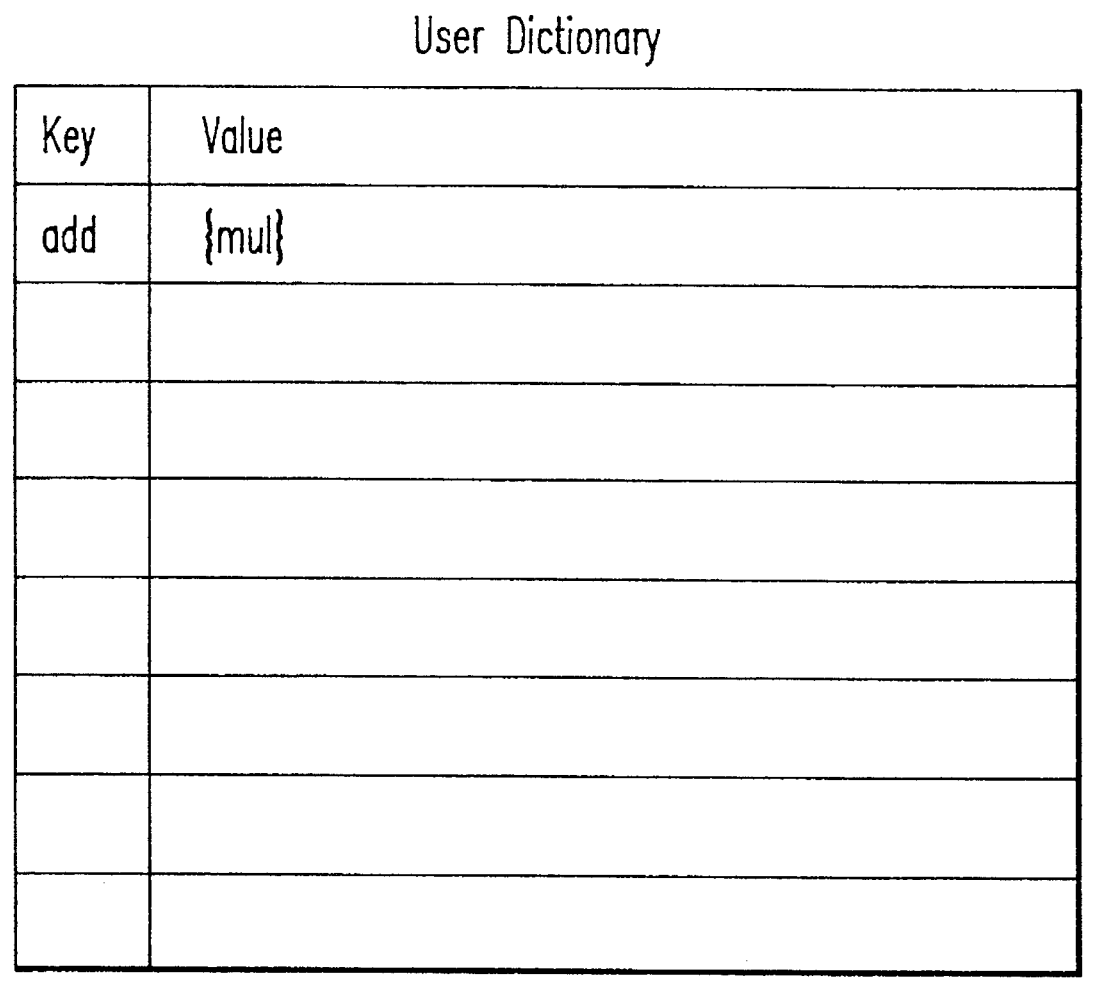

As an SPDL document is being processed, four types of dictionaries are used to look up values and procedures used by the document; a system dictionary such as is shown in FIG. 12, a user dictionary such as is illustrated in FIG. 23, context dictionaries, and content dictionaries which are created by tokensequences. A dictionary is a set of ordered pairs of objects corresponding to keys and values. Whenever a key is encountered in the SPDL content of a document, the value in the dictionary is substituted therefor. The value portion of a dictionary can be any type of value such as an integer, real, procedure, or any other type of object.

FIG. 12 is an example of a system dictionary. The system dictionary contains all the operators of SPDL content in the key field and corresponding procedures in the value field. For example, when "add" is encountered in the SPDL content, the value corresponding to add is looked up in the system dictionary, for example, and the procedure corresponding to add indicates two values are popped from the operand stack, their types are checked, they are added, and the result is pushed back into the operand stack. Other types of procedures which might be found in the system dictionary are illustrated in FIG. 12 and there will ordinarily be many more entries in the system dictionary. The system dictionary is not modifiable by the user or SPDL document and is part of the system which processes the SPDL documents.

The next type of dictionary is a user dictionary. The user dictionary is initially empty but can have entries added and modified by tokensequence elements. Not only can information be written into it, but once it is written, it can be changed by the user. It is the dictionary in which the entries are user modifiable (e.g. the dictionaries are read/write dictionaries) and which the user does not need to create using the operator 'dict'. The values in a user dictionary can be any type of value and include integers, reals, and procedures. Conceptually, there is only one user dictionary. However, if one hierarchical level requires a modified user dictionary, whereas other levels do not use the modified dictionary, the system will be required to store different values for the same key for the different hierarchical levels and therefore, there will be different entries in the user dictionary for the different hierarchical levels.

The next type of dictionary is a context dictionary. Whereas there is only one system dictionary and one user dictionary, there can be many context dictionaries for each hierarchical level and within a hierarchical level. The context dictionaries are read-only dictionaries. That is, once the context dictionaries have been defined, they cannot be modified by a user. The context dictionaries are created by tokensequences under a dictionary generator structure element. A further explanation of generation of context dictionaries can be found in commonly owned copending U.S. patent application 07/931,808, filed on Aug. 11, 1992, entitled "Method and System to Handle Dictionary Generator and Context Declaration in Standard Page Description Language" and the disclosure of which is incorporated by reference herein.

The last type of dictionary is a content dictionary which is a user defined dictionary and defined by the tokensequence element. The content dictionary is a read/write dictionary when created and is valid only within the scope of the most immediately superior structure element. A more detailed explanation of the content dictionary will be given below.

Figure 13:
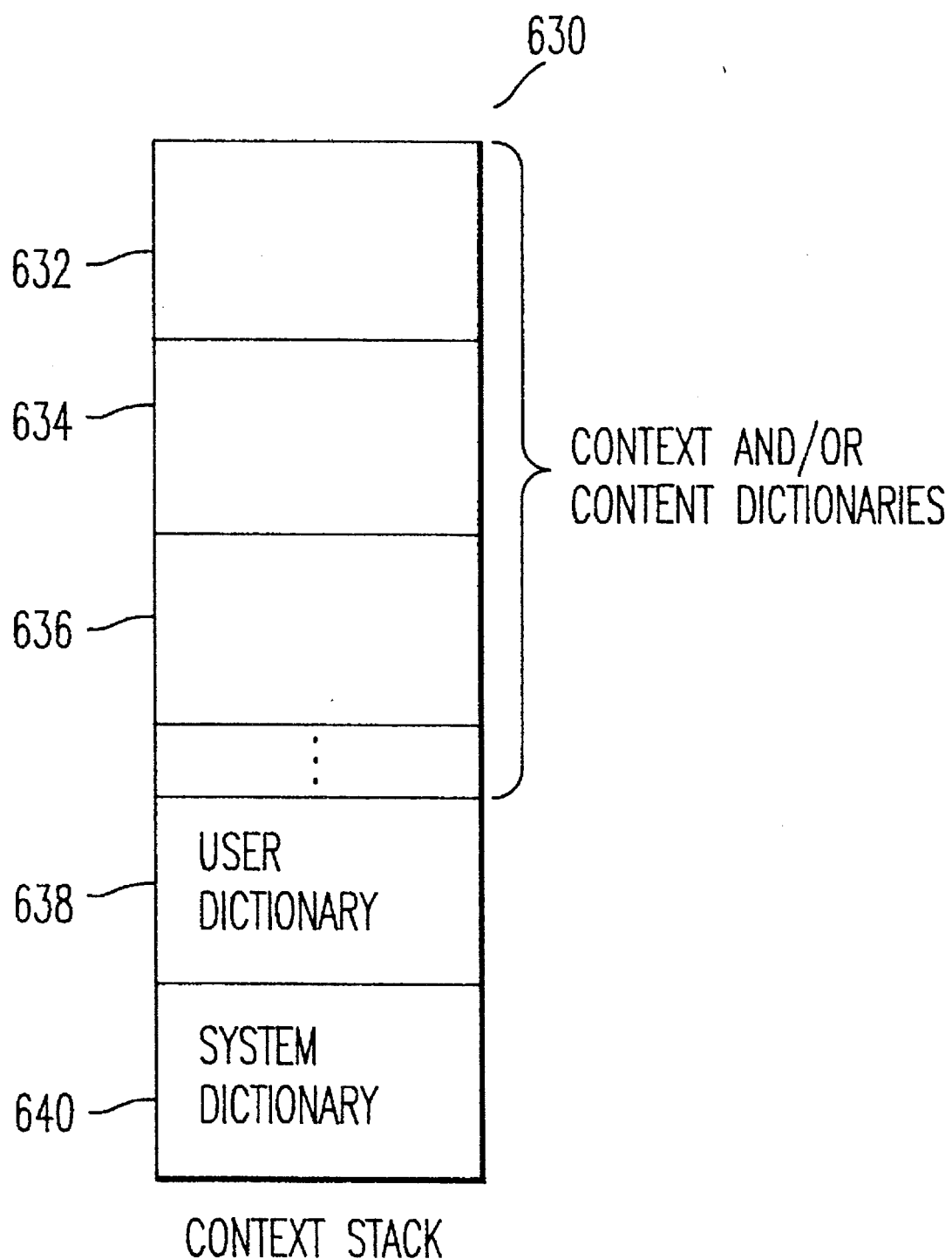
FIG. 13 is an illustration of the context stack.

It is possible that keys in dictionaries being searched can be found in any of the various dictionaries. Therefore, there is a search order employed by the present invention to search the various dictionaries for the keys and defined by what will be referred to as "the context stack", as illustrated in FIG. 13. The context stack is searched from the top. The context and content dictionaries are the first dictionaries to be searched. The user dictionary is the next to the bottom and the system dictionary is at the bottom of the stack. In the parent applications of this continuation-in-part application, the context stack was described only in reference to the context dictionaries. However, the context stack defines the search order for all dictionaries.

When a key is searched for in the dictionaries, first the pointer to the context stack in the CCI data structure is examined to determine the context and content dictionaries to be searched. If the key is not found in the context or content dictionaries pointed to by the context stack link data structures, explained below, the user dictionary is searched by examining the pointer to the user dictionary link structure in the CCI data structure to determine if the key exists in the user dictionary. If the key is not found in any of the context or content dictionaries, or the user dictionary, the system dictionary is then searched. It is not necessary to have a pointer to the system dictionary in the prologue data structure or CCI data structure as there is only one system dictionary and the system dictionary is not modified. The system dictionary can always be found in the same location and therefore, there is no need to keep track of the location of the system dictionary for the various hierarchical levels of the document.

The context stack is referred to as a stack which defines the search order of the four types of dictionaries. However, the context stack is not a stack in the conventional sense of the term. The term context stack is used to simplify the explanation of the search order requirements for the dictionaries. In the context stack, the bottom entry is always the same and points to the address of the system dictionary. The next highest entry in the context stack are the user dictionary link structures which correspond to the pointer 231 or pointer 252 in the picture/pageset prologue data structure and CCI data structure, respectively. It is possible for the user dictionary link structure to point to subsequent user dictionary link structures. The highest entries in the context stack are the context and content dictionaries pointed to by context stack link data structures. As the pointer to the user dictionary link structure, a middle element in the context stack, can be modified and used to change entries in the user dictionary without affecting the context and content dictionary search order which is higher in the context stack, the term "context stack" is not necessarily a conventional stack but a conceptual stack-like structure.

Turning now to the various dictionaries used by the CCI data structures and picture/pageset prologue data structures used when processing a document, there are three levels of dictionaries. At the highest dictionary level are the context dictionaries and content dictionaries which are user defined dictionaries by tokensequences. The context dictionaries are read-only dictionaries. Therefore, once they are created, they cannot be modified. Context dictionaries are only used at the hierarchical level in which they are created and for hierarchical levels below the level in which they were created. Context and content dictionaries are at the highest dictionary level, and therefore are searched first when a key is encountered. If the key is found in one of the context or content dictionaries, no further searching of the dictionaries is necessary. If the key is not found in the context or content dictionaries, the user dictionary is next searched for the key. If the key is not found in the user dictionary, the system dictionary is searched last.

Figure 14:
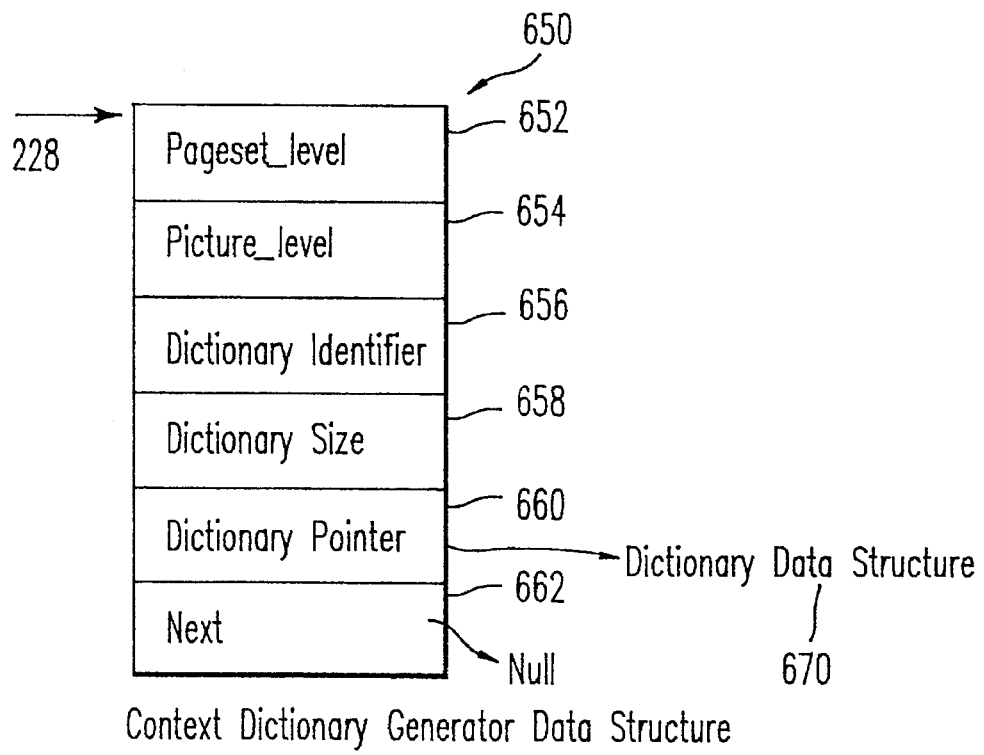
FIG. 14 illustrates a context dictionary generator data structure.

Before an explanation is given of the handling of the context and content dictionaries and the search order thereof, a brief description of the generation process of context dictionaries is necessary. When a dictionary generator structure element such as dictionary generator 54 of the document illustrated in FIG. 4 is encountered, the tokensequence 55 under the dictionary generator will define a dictionary to be generated and the structure processor labels the dictionary a context dictionary and creates a context dictionary generator data structure 650, as illustrated in FIG. 14. The context dictionary generator data structure is a linked list containing information pertaining to the pageset_level 652, the picture_level 654, a dictionary identifier 656 corresponding to the name of the dictionary, the dictionary size 658, the pointer to the dictionary data structure 660, and a pointer to a next dictionary generator 662. The pointer 228 to the dictionary generator data structure is found in the picture/pageset prologue data structure 220 of FIG. 8.

The entry "next" 662 in a newly created dictionary generator data structure will point to a previously created dictionary generator data structure if more than one context dictionary is created. This is because newly created dictionary generator data structures are inserted before previously created dictionary generator data structures and not after them.

Figure 15:
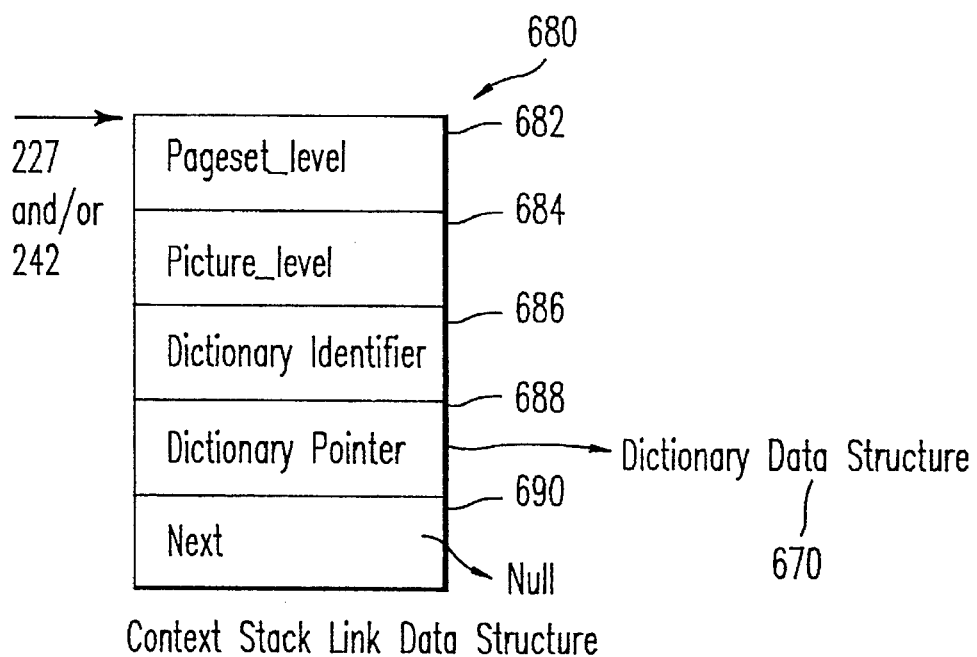
FIG. 15 illustrates a context stack link data structure.

After a context dictionary has been created by a dictionary generator, it is put on the top of the context stack using a context stack link data structure. The search order of the context and content dictionaries can be modified. A context declaration defines or modifies the search order of context dictionaries. Also, there are operators in tokensequences which can manipulate the context stack. The search order for the context dictionaries is defined by the context stack link data structures, an example of which is illustrated in FIG. 15. A context stack link data structure 680, is pointed to by pointer to context declaration 227 of picture/pageset prologue data structure 220 and/or pointer to context stack 242 of CCI data structure 240 illustrated in FIG. 8. The pointer to context declaration and the pointer to the context stack, while having different names, serve similar purposes and will be identical upon the initial creation of the CCI data structure and will have the same basic structure such as that illustrated in FIG. 13.

The context stack link data structure contains pageset_ level 682 and picture_level 684, e.g. the levels at which the data structure was created, a dictionary identifier 686 which is the name of the dictionary, a pointer to the dictionary 688 which contains the address of the dictionary data structure 670, and an entry "next" 690 which points to either null or another context stack link data structure. If there are more than one context dictionary in the context stack, entry "next" 690 will point to a context stack link data structure for a subsequent dictionary. Note that the context stack link data structure is referred to as the context dictionary data structure in the aforementioned parent U.S. patent applications. A more complete description of the context stack link data structure of FIG. 15 can be found in, commonly owned, co-pending U.S. patent application 07/931,808, entitled "Method and System to Handle Dictionary Generator and Context Declaration in Standard Page Description Language" filed on Aug. 11, 1992, which is incorporated by reference.

Figure 16A:
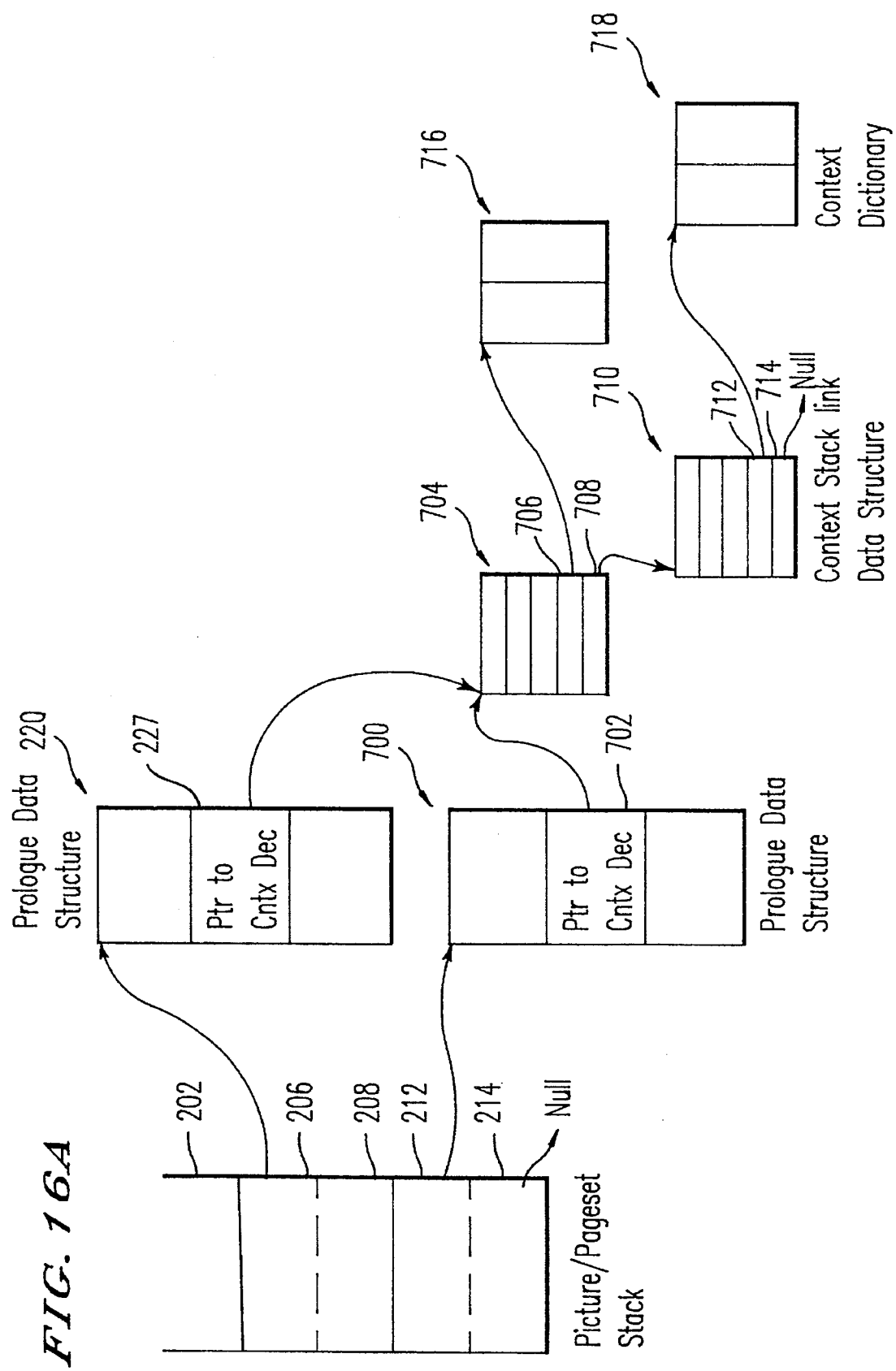
FIG. 16A–16C illustrate various states of the picture/pageset stack, CCI data structure, prologue data structure, context stack link data structure and context dictionaries during the processing of a document.
Figure 16B:
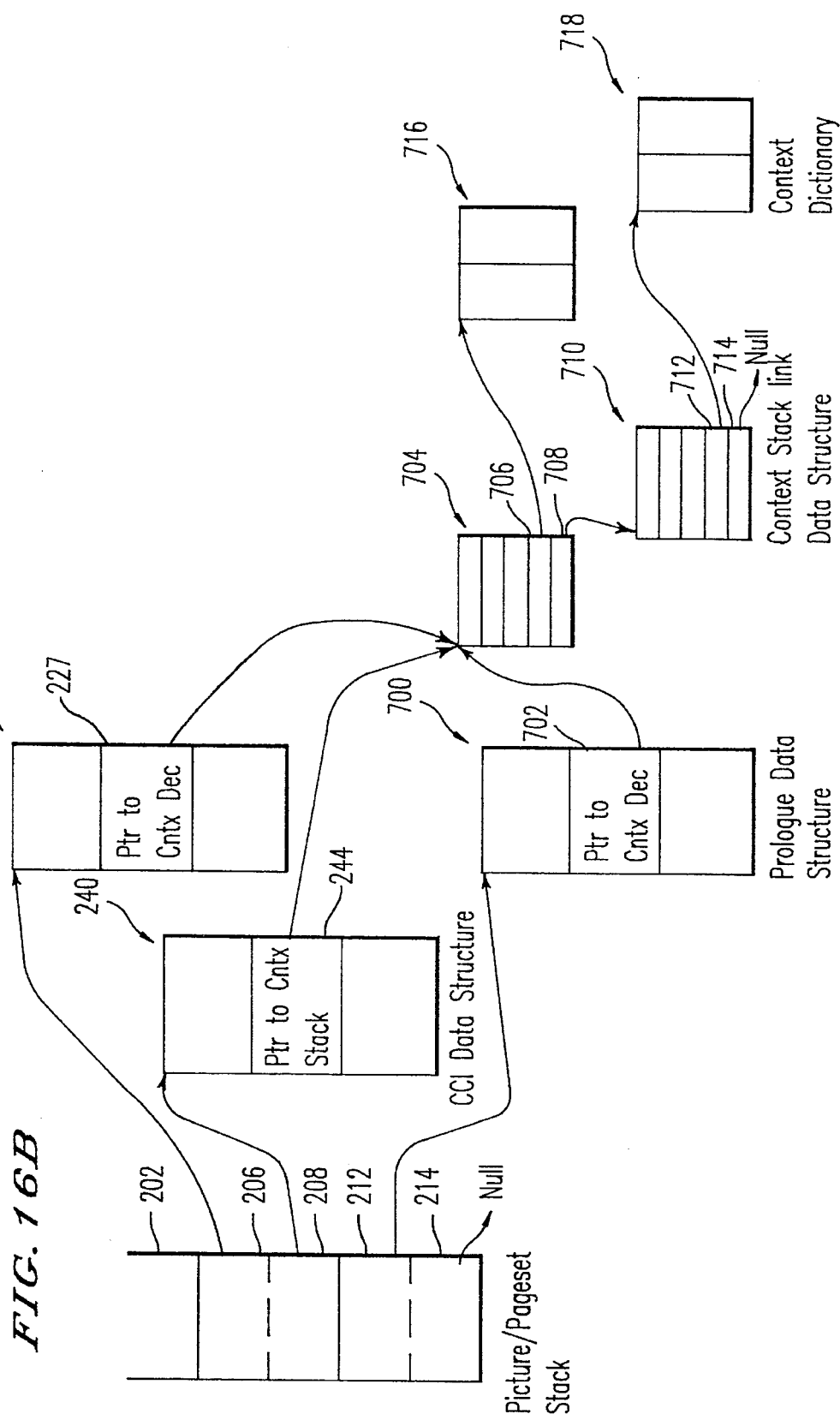
Figure 16C:
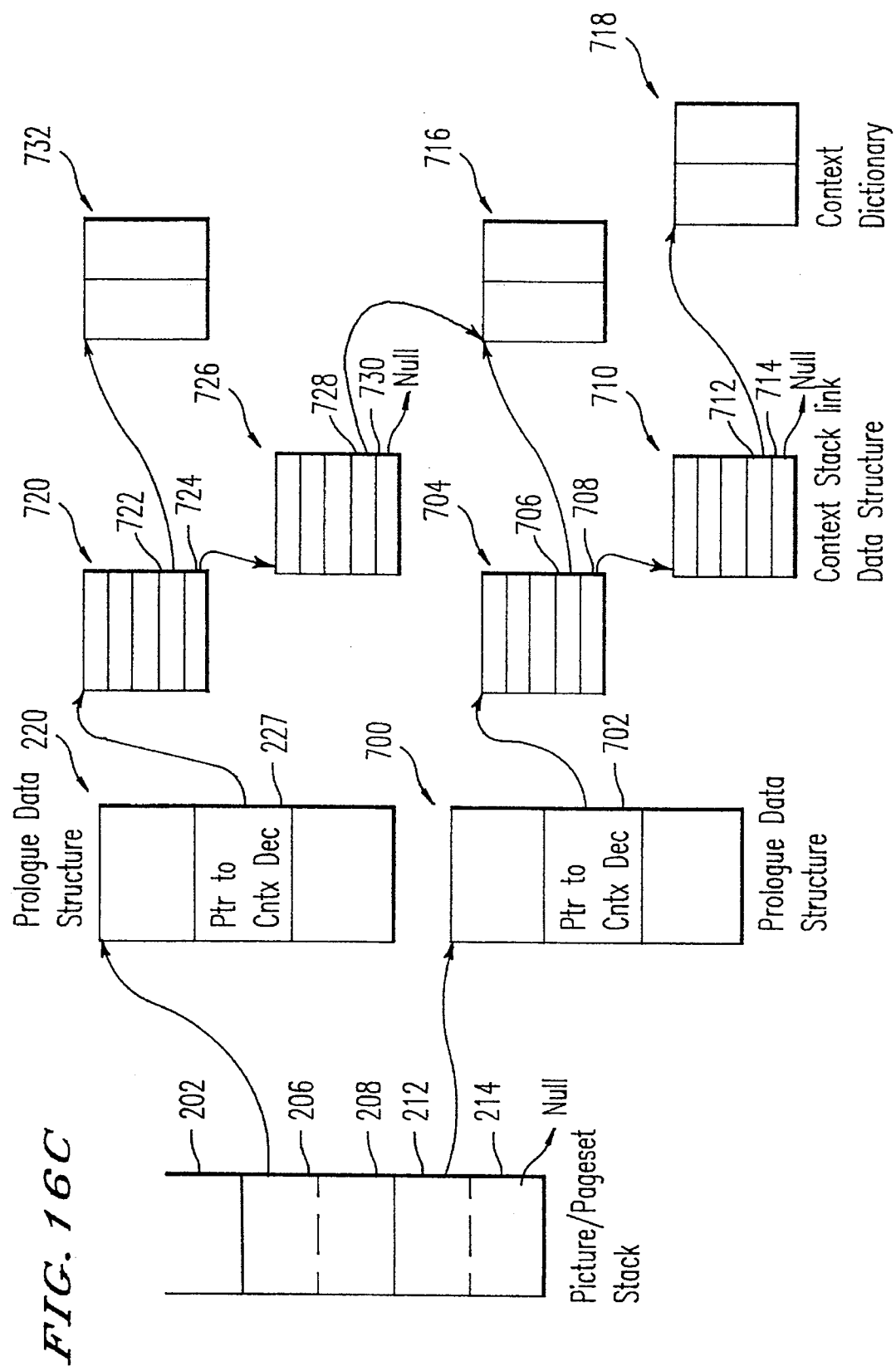

Examples of the use context stack link data structures are illustrated in FIGS. 16A–16C. FIG. 16A illustrates the picture/pageset stack, the prologue data structures, the context stack link data structures, and context dictionaries at the beginning of picture 61 of FIG. 4. The picture/pageset prologue data structure 700, created for pageset 50, pointed to by pointer 212 of the picture/pageset stack 202 has a pointer to context declaration 702. The pointer to the context declaration 702 points to a context stack link data structure 704 which, through pointer 708, points to a subsequent context stack link data structure 710. The context stack link data structures point to context dictionaries 718 and 716 which were created by dictionary generators 54 and 56 of FIG. 4 and their tokensequence 55 and 57 respectively.

Upon encountering picture 61 of FIG. 4, the hierarchical level of the document drops one level and as described in the flowchart of FIG. 10A, an entry is placed on the picture/pageset stack having a pointer 206 pointing to prologue data structure 220 and a pointer to CCI data structure 208 which points to null. The prologue data structure 220 has the same entries as the prologue data structure 700. Therefore, the pointer to context declaration 227 points to the same context dictionary link structure as the pointer to context declaration 702. The search order of the context dictionaries for both the first and second hierarchical levels would be context dictionary 716 and then context dictionary 718, as illustrated in FIG. 16A.

When the first tokensequence is encountered under the picture element 61, it is necessary to create a context of interpretation including a CCI data structure 240 as illustrated in FIG. 16B. In FIG. 16B, dictionary identifier 64 specifies the context dictionaries created by 54 and 56. A tokensequence such as tokensequence 66 under dictionary generator 65 will necessitate the creation of the CCI data structure 240 and the entries in the CCI data structure 240 will be copied from prologue data structure 220 as described in the process illustrated in the flowchart of FIG. 12. As the values in the CCI data structure 240 are copied from the picture/pageset prologue data structure 220, the pointer to context stack 244 points to the same address as the pointer to context declaration 227 in the picture/pageset prologue data structure 220.

FIG. 16C illustrates the picture/pageset stack, prologue data structure, context stack link data structures, and context dictionaries after the tokensequence 66 of FIG. 4 when dictionary identifier 64 specifies only one context dictionary generated by dictionary generator 56. Context dictionary 732 was previously created by elements not illustrated in FIG. 4. Context declaration 63 and dictionary identifier 64 created context stack link data structure 726. Context stack link data structure 720, created by dictionary generator 65 and tokensequence 66, points to dictionary 732 using pointer 722. Context stack link data structure has a pointer "next" 724 pointing to a second context link data structure 726. Context stack link data structure 726 points using pointer 728 to context dictionary 716 which was previously created by dictionary generator 56. As context stack link data structure 726 is defined by contex declaration 63, the entry "next" 730 points to null. The search order of the context dictionaries of the second hierarchical level of the document is context dictionary 732 and then context dictionary 716, as illustrated in FIG. 16C.

As previously described, one way of modifying the highest level of the context stack made up of context stack link data structures is to use a context declaration structure element containing dictionary identifiers. However, it is possible to push a dictionary onto the context stack data structures or pop a dictionary off of the context stack data structures using a tokensequence in a content. The "begin" operator in a tokensequence pushes a dictionary referenced in the operand stack into the context stack. This function is performed using the process illustrated in the flowchart of FIG. 17.

Figure 17:
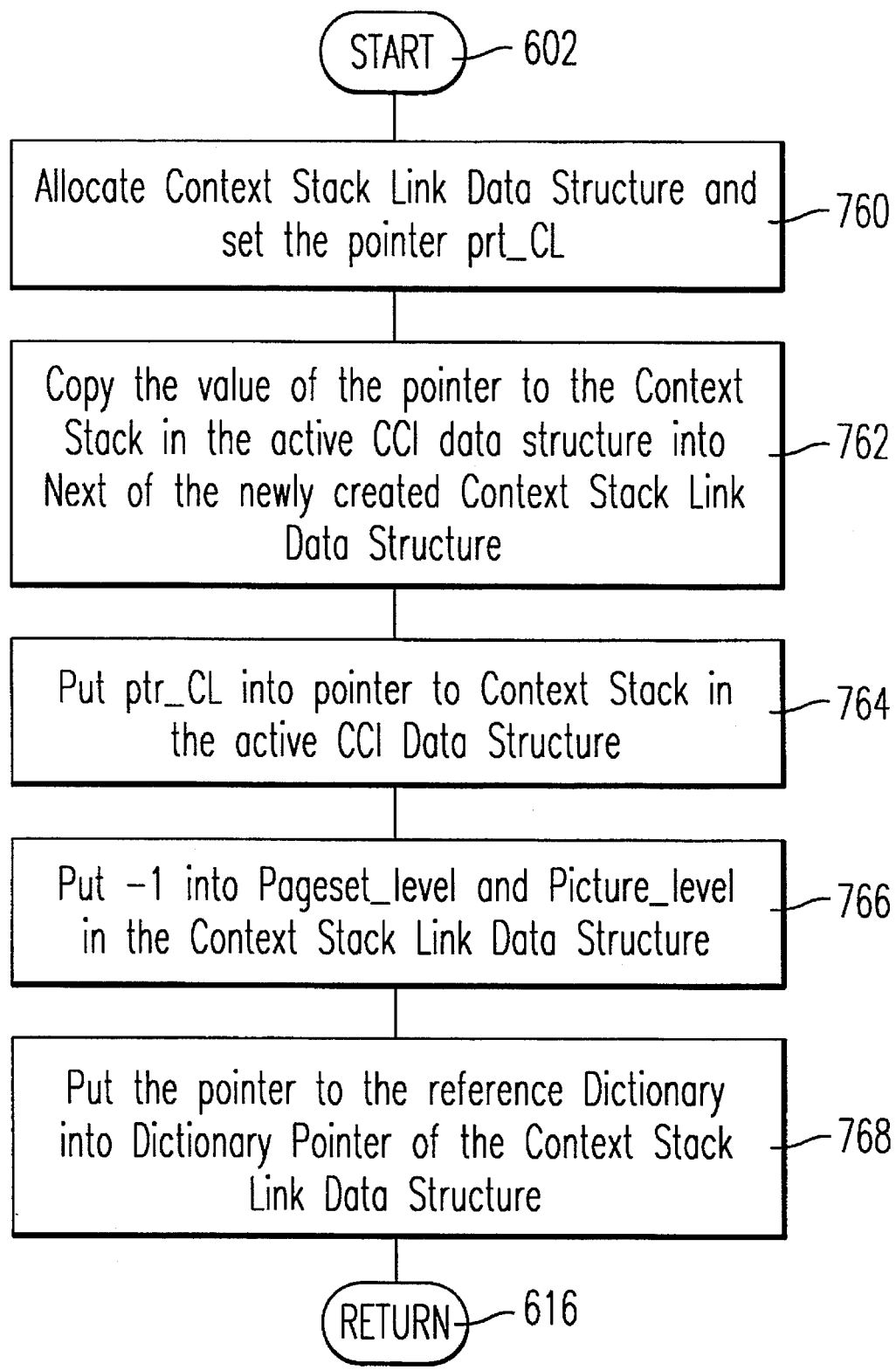
FIG. 17 illustrates the process used to push a context dictionary into a context stack link data structure when instructed by a tokensequence.

When an operator such as "begin" is found in a tokensequence, the process used to push a content dictionary into the context declaration data structures illustrated in FIG. 17 is called. Step 760 allocates the memory used by a new context stack link data structure and the address of this allocated context link data structure is placed in the pointer ptr_CL. In step 762, the value of the pointer to the context stack in the active CCI data structure is copied into the "next" entry of the newly created context stack link data structure. Next in step 764, the pointer ptr_CL is placed into the active CCI data structure in the pointer to context stack of the data structure. Step 766 places the value −1 into the entries pageset_level and picture_level of the context stack link data structure allocated in step 730. The reason why −1 is placed into the pageset_level and picture_level is to indicate that the context stack link data structures have been manipulated by a tokensequence. As will be explained later, if a dictionary is popped out of the context stack data structures, there are different processes for deallocation of memory depending on how the dictionaries were placed in the context stack link data structures (i.e. whether the dictionaries are context or content dictionaries). Last, step 768 places the pointer to the dictionary pushed onto the context stack into the dictionary pointer of the context stack link data structure created in step 760.

Figure 18:
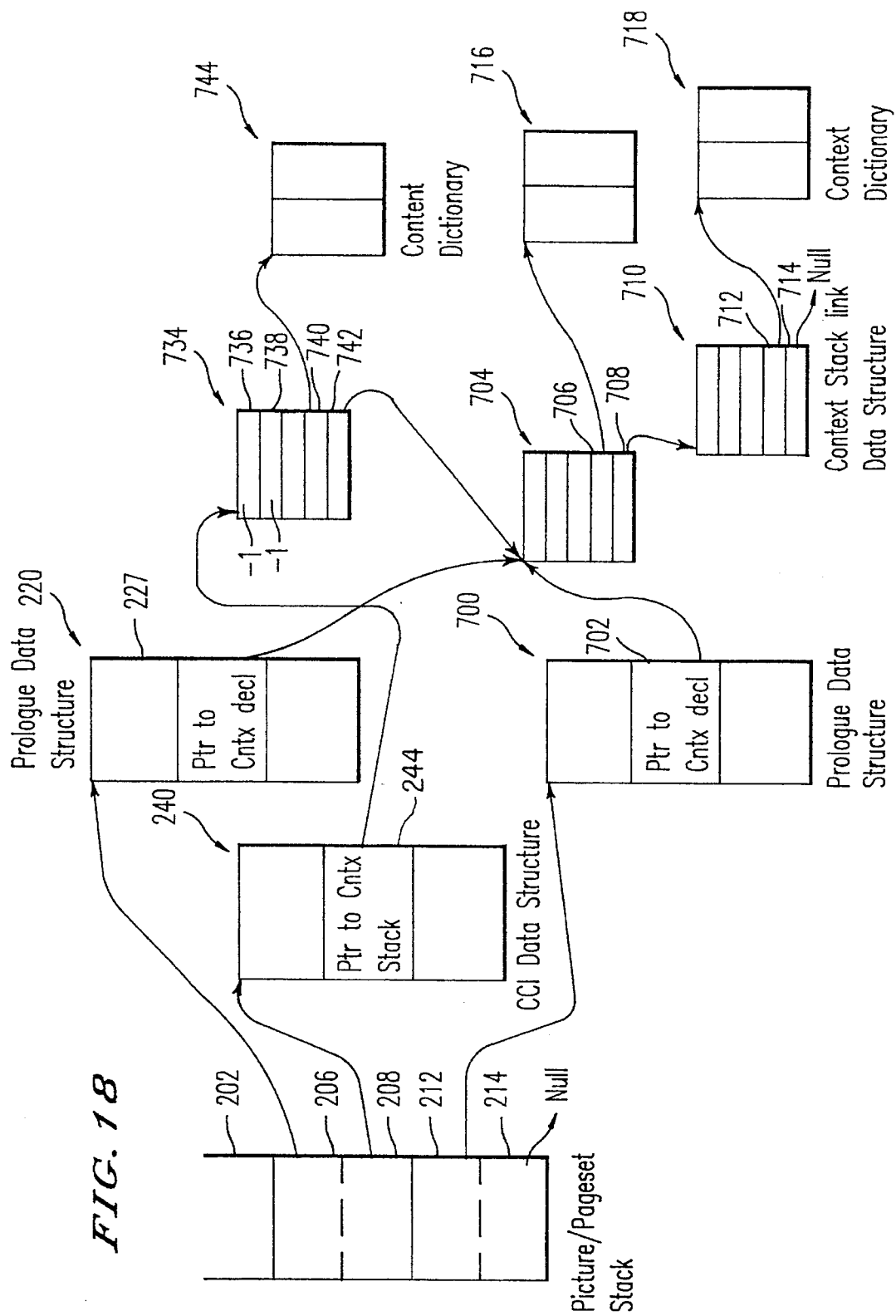
FIG. 18 illustrates various data structures after a dictionary has been pushed into the context stack link data structures.

FIG. 18 illustrates the picture/pageset stack, CCI data structure, prologue data structures, context stack link data structures, and context and content dictionaries after a tokensequence has pushed a content dictionary 744 onto the context stack. The structure illustrated in FIG. 18 can be considered to be generated at tokensequence 66 of FIG. 4 and would be subsequent to the structure illustrated in FIG. 16B.

Context dictionary 744 can be considered to have been created by the operator "dict" in tokensequence 66. When tokensequence 66 is encountered, the CCI data structure 240 of FIG. 16B is created. The tokensequence 66 creates context stack link data structure 734 using the process illustrated in FIG. 17 when the operator "begin" is executed. As tokensequence 66 is being executed, context stack link data structure 734, illustrated in FIG. 18, has the pageset_ level 736 and the picture_level 738 as −1 because the context link data structure 734 was created by a tokensequence and not by the structure processor. The context stack link data structure 734 points, using pointer 740, to a previously created dictionary 744. Pointer 742 of context link data structure 734 points to the next lowest context stack link data structure 704. Consequently, when context and content dictionaries are searched using the data structures illustrated in FIG. 18, first dictionary 744 is searched, then dictionary 716, and dictionary 718. If the key is found in any of these dictionaries, the searching of the dictionaries stops. If the key is not found in the content or context dictionaries, the user dictionary and system dictionary are then searched.

Figure 19:
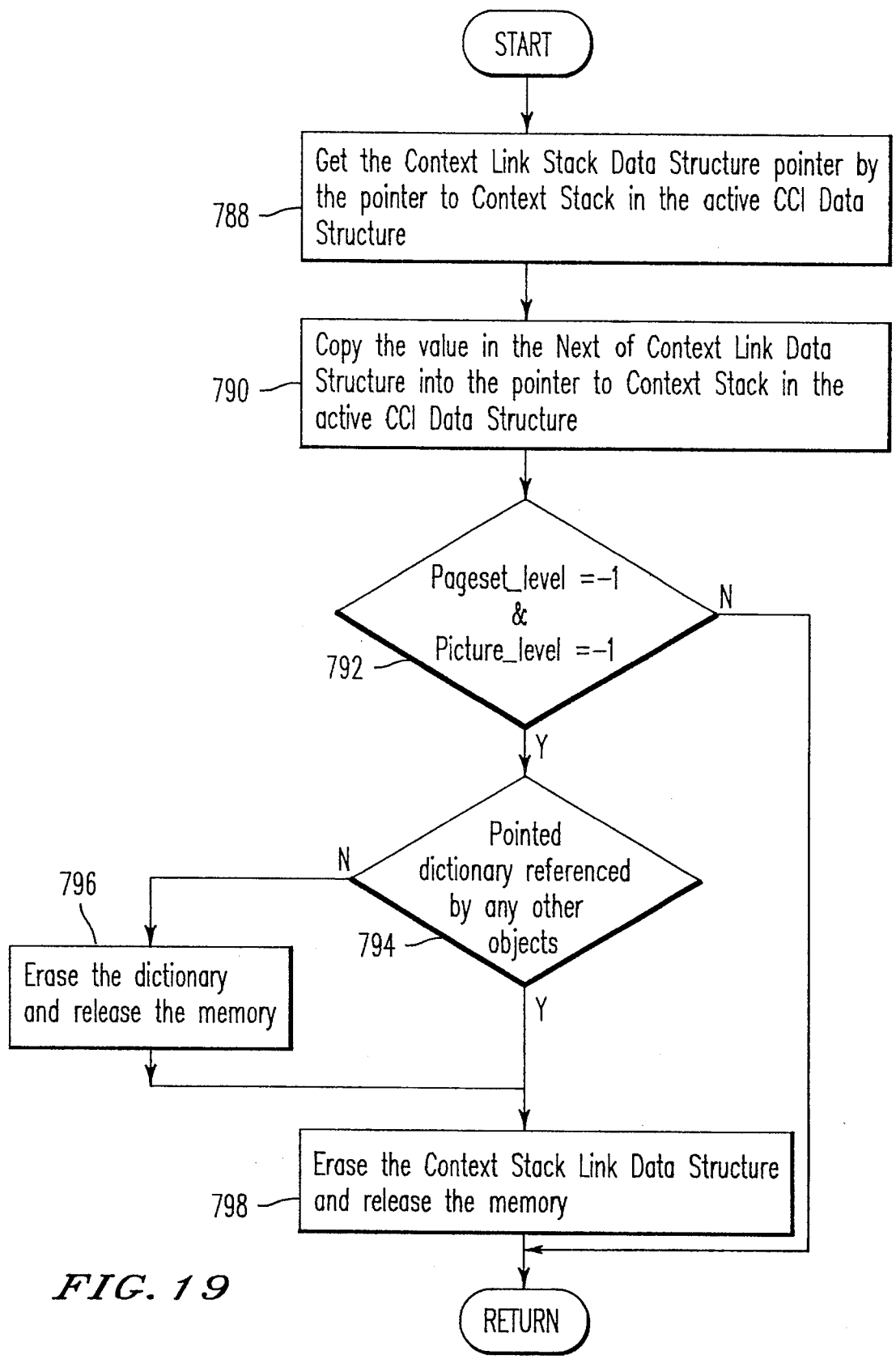
FIG. 19 illustrates the process executed when a dictionary is popped out of a context stack link data structure by a tokensequence.

FIG. 19 illustrates a process used to pop a dictionary out of the context stack link data structures using a tokensequence. When the routine of FIG. 19 is called, for example when a tokensequence contains an "end" operator, step 788 determines the address of the context stack link data structure pointed to by the context stack pointer of the active CCI data structure. Next, as the context link data structure pointed to by the context declaration is no longer to be used, the value of "next" in the context link data structure is copied to the context declaration pointer of the active CCI data structure. Step 792 determines if pageset_level equals −1 and picture_level equals −1. If both of these values are equal to −1, the context stack link data structure was created by a push onto the context stack and therefore, it is possible that the dictionary pointed to will not be referenced by other objects and the memory for the dictionary can be released. If the pageset_level and picture_level are equal to −1, step 794 determines if the dictionary of the context stack link data structure is referenced by any other objects. If it is not, the dictionary is erased and the memory it was occupying is released in step 796. If the dictionary is referenced by other objects, the dictionary cannot be erased and step 798 only erases the context stack link data structure and its memory. If the pageset_level and the picture_level are both not equal to −1, the dictionary may be needed for later use and will not be erased in step 796. Instead, only the memory of the context stack link data structure will be released in step 798. Releasing memory allows system resources to be freed and allows used memory to be deallocated during processing.

Figure 20:
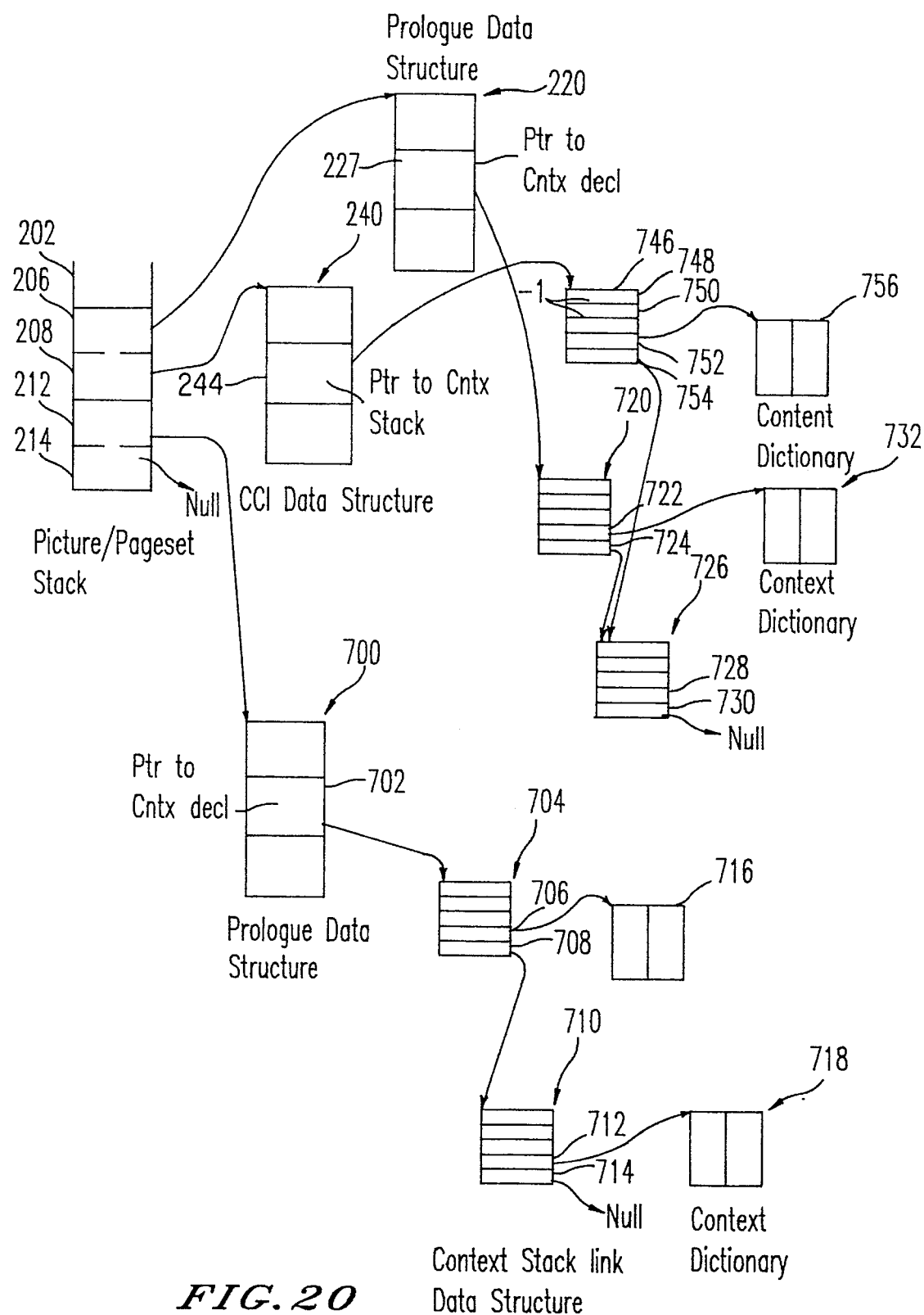
FIG. 20 illustrates the various stacks and data structures after pushing and popping of context stack link data structures have occurred.

FIG. 20 illustrates the structure of the picture/pageset stack, CCI data structure, prologue data structures, context stack link data structures and context and content dictionaries after a tokensequence has popped a dictionary 732 off of the context stack link data structures of the structure of a document illustrated in FIG. 16C and pushed a dictionary 756 onto the context stack link data structures. The tokensequence, for example tokensequence 70 of FIG. 4 which causes the dictionaries to be popped and pushed, creates the CCI data structure 240. When the tokensequence instructs that dictionary 732 is to be popped off of the context stack link data structures, pointer 244 will no longer point to context stack link data structure 720 but will point to context link data structure 726. When the tokensequence contains a push instruction, context stack link data structure 746 is created having picture_level and pageset_level equal to −1 and pointed to by pointer 242, as illustrated in FIG. 20. The dictionary 756, previously created, is pointed to by pointer 752. "Next" 754 of context stack link data structure 746 points to context link data structure 726 instead of context link data structure 720 as dictionary 732 has been popped off of the context link data structures. When a tokensequence is being processed, the pointer to context declaration 227 in prologue data structure 220 is not affected but the pointer to the context stack 242 is modified.

Figure 21:
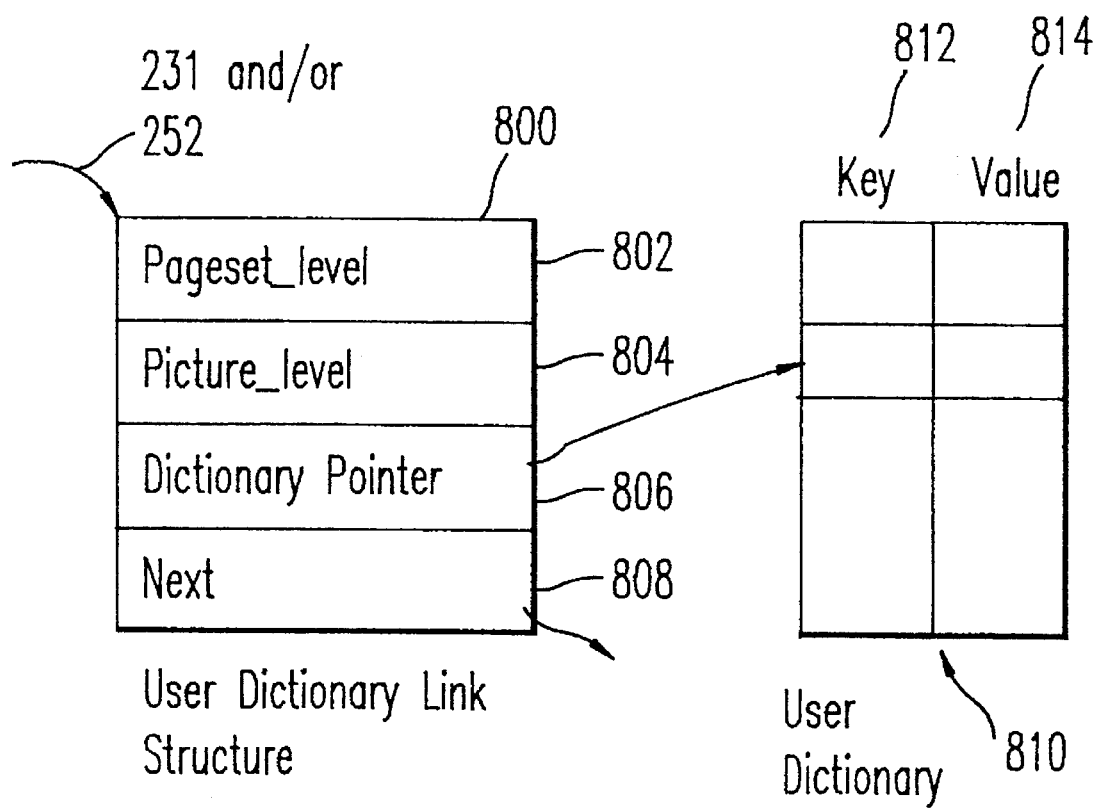
FIG. 21 illustrates the user dictionary link data structure and a user dictionary.

Turning now to the implementation of user dictionaries, although the standard for implementing the Standard Page Description Language indicates that there should only be one user dictionary, as the user dictionary is modifiable, it is possible for the different hierarchical levels of a document to use different keys and values in the user dictionary. Therefore, conceptually, the single user dictionary can be considered as being made up of various smaller user dictionaries in the present invention. A user dictionary link structure, as illustrated in FIG. 21, is used to keep track of the various smaller user dictionaries within the different hierarchical levels.

User dictionary link structure 800 is pointed to by the pointer to user dictionary link 231 of the prologue data structure 220 of FIG. 8 and/or the pointer to user dictionary link 252 of the CCI data structure 240. The user dictionary link structure contains a pageset_level 802, a picture level 804, a pointer to a user dictionary 806, and an entry "next" which points to either another user dictionary link structure or to null. The user dictionary, for example 810, is similar to the context dictionaries and system dictionary in that it has two columns, a key column 812 and a value column 814. The user dictionary can be modified by any tokensequence and may have entries placed therein by a setup procedure, for example setup procedure 58 having tokensequence 59 within prologue 51 of FIG. 4.

Figure 22:
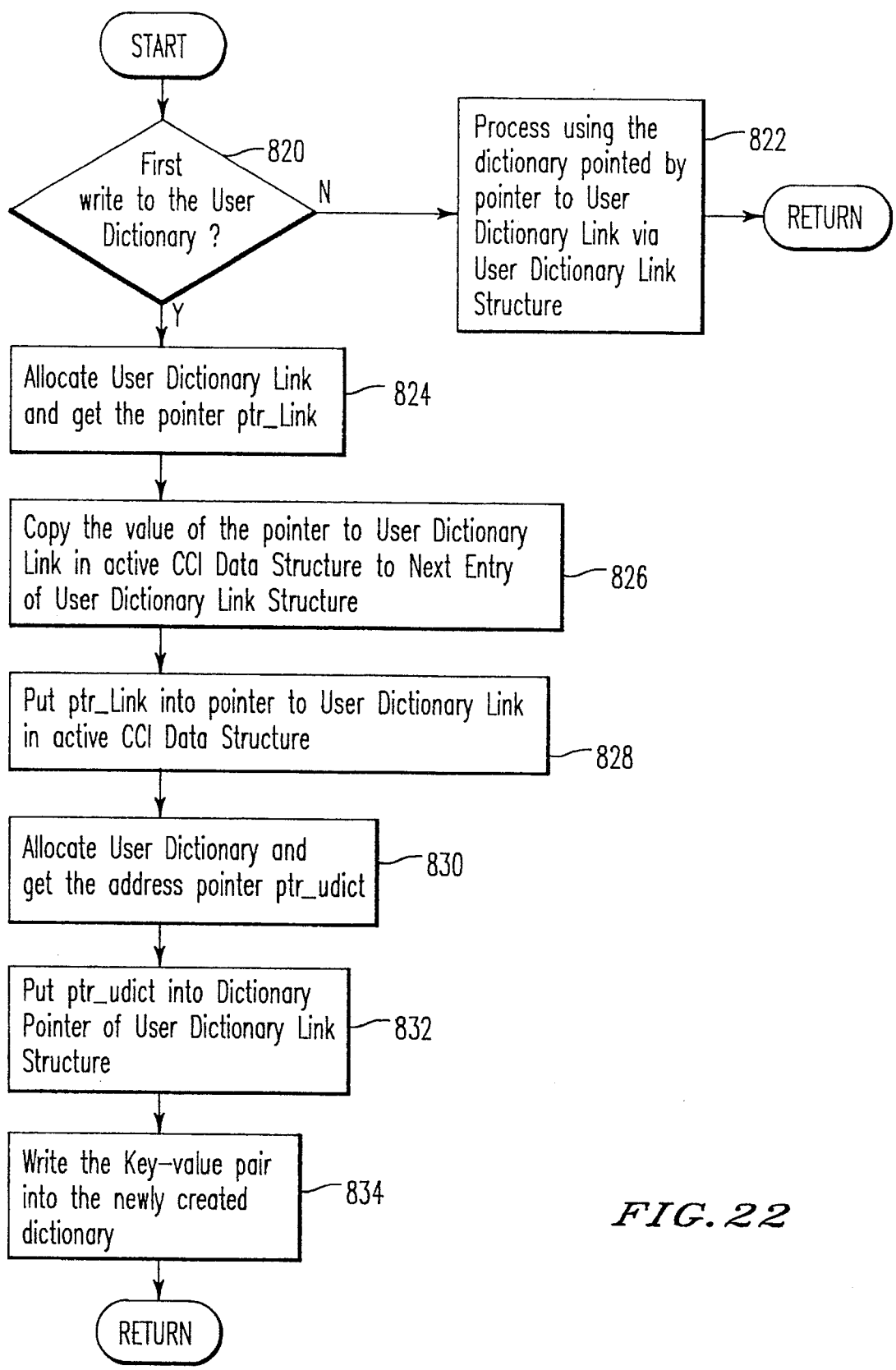
FIG. 22 illustrates the process used to manipulate the user dictionary.

FIG. 22 illustrates a process used whenever there is an operator "def", or a write including a modification, to the contents of the user dictionary. A modification of the user dictionary and write to the user dictionary are handled in a similar manner. If there is a write or modification to the user dictionary, the keys in the dictionary are searched. In both cases, if the key being searched for is found, the corresponding value is modified. If the key is not found, the key value pair is written into the dictionary. Step 820 examines whether this is a first write, "def", to the first user dictionary in the user dictionary link. If there is a subsequent write to the user dictionary after the user dictionary has been created, step 822 adds to the existing user dictionary the entries indicated by the tokensequence which write to the user dictionary. If this is the first time the user dictionary is written to for a particular tokensequence, flow proceeds from step 820 to step 824 where memory is allocated for a user dictionary link structure. Also, the pointer ptr_link to this allocated user dictionary link is determined. Next in step 826, the address of the pointer to the user dictionary link structure in the active CCI data structure is copied to "next" of the newly created user dictionary link structure.

In step 828, the pointer to the newly created dictionary link structure is placed into the active CCI structure at the entry for the pointer to the user dictionary link. For example, this could be entry 252 of CCI data structure 240 illustrated in FIG. 8. Step 830 allocates the memory for the user dictionary and determines the address at which the entries in the user dictionary will be added. It is necessary to create a smaller user dictionary within the user dictionary for modifications of the user dictionary because user dictionaries of higher hierarchical levels should not be modified because they may be needed in an unmodified form during further processing. Therefore it is necessary to allocate a new portion of the user dictionary, even for just a modification when no additional entries in the user dictionary. Step 832 places the pointer ptr_udict into the dictionary pointer of the user dictionary link structure. For example, the ptr_udict would be placed in dictionary pointer 806 of user dictionary link structure 800 illustrated in FIG. 21. Last, the key-value pair which is to be added or modified is written into the newly created dictionary in step 834. Subsequently, flow returns to the content processor for additional processing of the tokensequence.

An example of a user dictionary, with one entry, is illustrated in FIG. 23. This user dictionary would be created by a tokensequence which contains the following content:

/add {mul}def

This tokensequence command indicates to place in the user dictionary, an entry "add" in the key column and in the corresponding value column {mul}, {mul} indicating a multiplication. When "add" is encountered in a document which is being processed, "add" is first searched in the context and content dictionaries. If it is not found in these dictionaries, the user dictionary is searched and "add" will be found. The value in the dictionary corresponding to "add" is "{mul}". When "add" is encountered in a document, the first two entries on the operand stack will be multiplied and the result pushed onto the operand stack. For example, if the command "2 3 add" is in a document when the key "add" corresponds to a value "{mul}", two is first pushed onto the operand stack, and three is pushed on top of two. When add is encountered, the top two values in the operand stack are multiplied together and the result, six, is pushed onto the top of the operand stack.

Figure 24A:
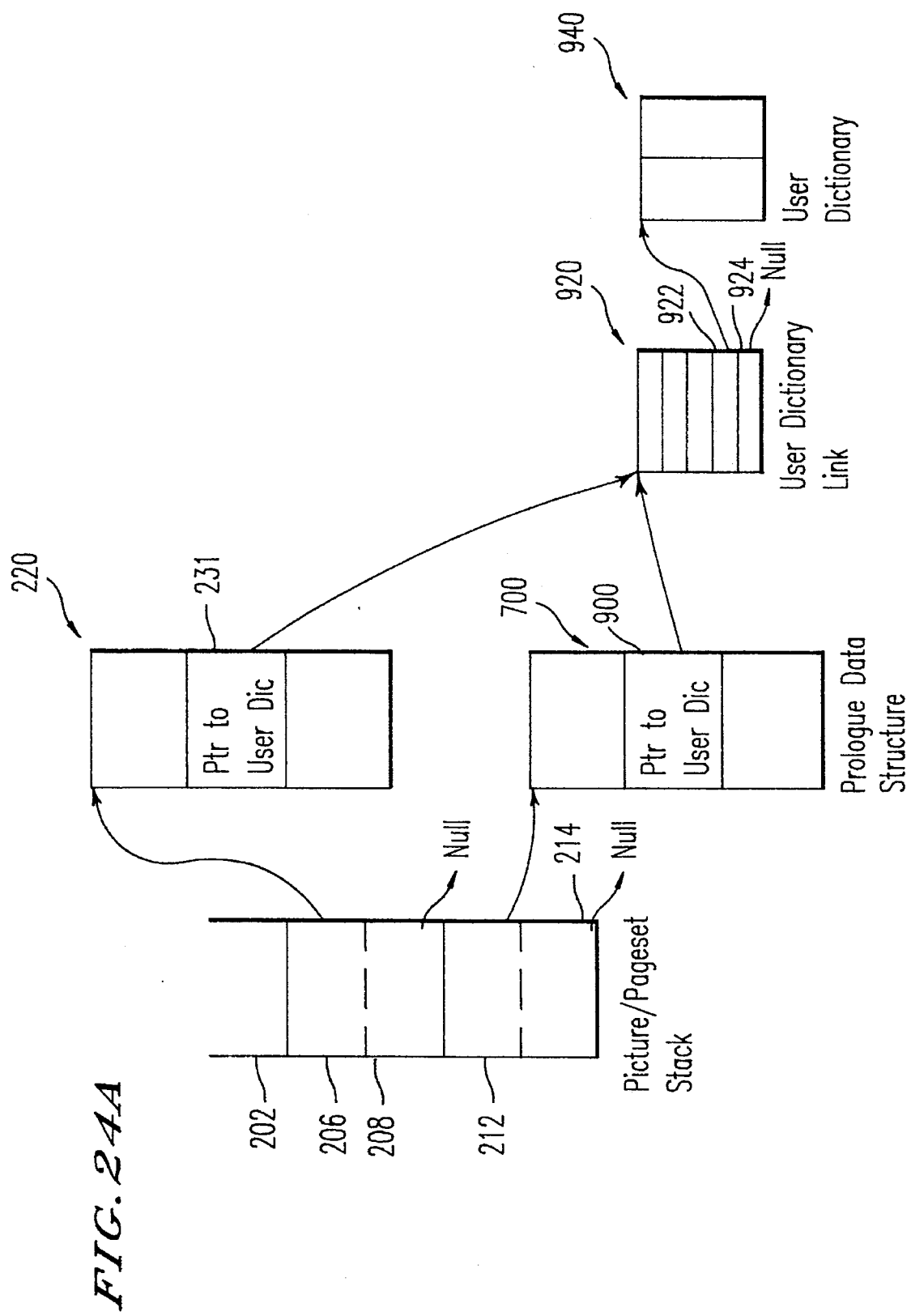
FIGS. 24A–24E illustrate the states of the picture/pageset stack, CCI data structure, prologue data structure, user dictionary links, and user dictionaries during various processing steps of a document.

FIGS. 24A–24E illustrate the picture/pageset stack, prologue data structure, user dictionary link structures, and user dictionaries that would exist as the document in FIG. 4 is being processed. FIG. 24A illustrates the states of the various structures at the beginning of picture 61 of FIG. 4. As picture 61 is on the second hierarchical level, there are two entries in the picture/pageset stack 202 and therefore, there are two prologue data structures 220 and 700. The user dictionary link structure 920 and user dictionary 940 were created by setup procedure 58 and its tokensequence 59.

Figure 24B:
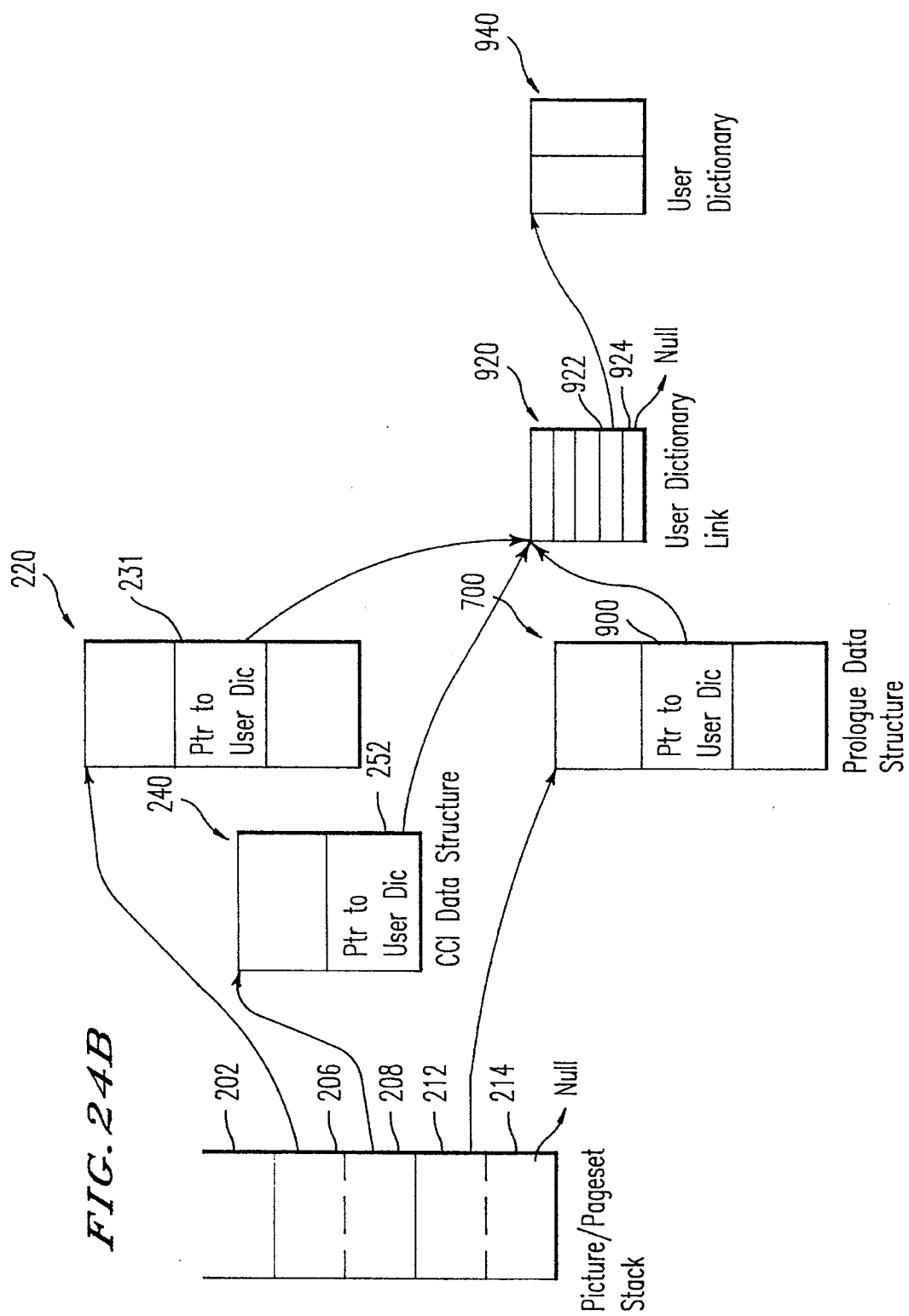

FIG. 24B can be representative of the structures as tokensequences 66 or 68, are being processed. FIG. 24B is the same as 24A except that a CCI data structure has been created because a tokensequence is being processed. The pointer to the user dictionary link 252 in the CCI data structure 240 has been copied from the pointer to user dictionary link 231 of the prologue data structure 220 and therefore points to the same user dictionary as pointer 231.

Figure 24C:
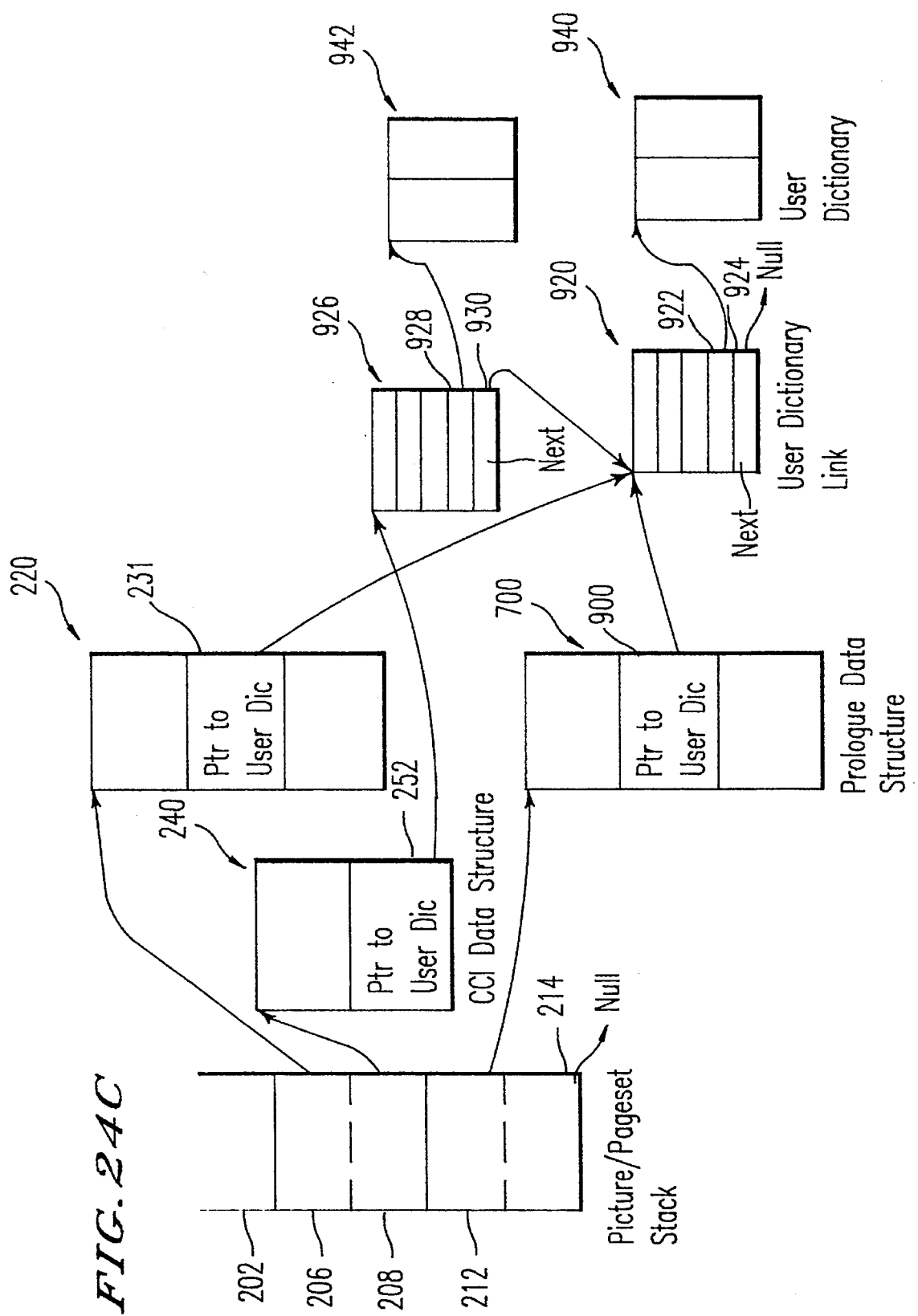

FIG. 24C illustrates setup procedure 67 and its tokensequence 68 in the process of writing entries into a user dictionary 942. When tokensequence 68 is being processed, CCI data structure 240 is created. When there is a modification or a write to a user dictionary for the first time at this second hierarchical level, the user dictionary link structure 926 and user dictionary 942 are created.

Figure 24D:
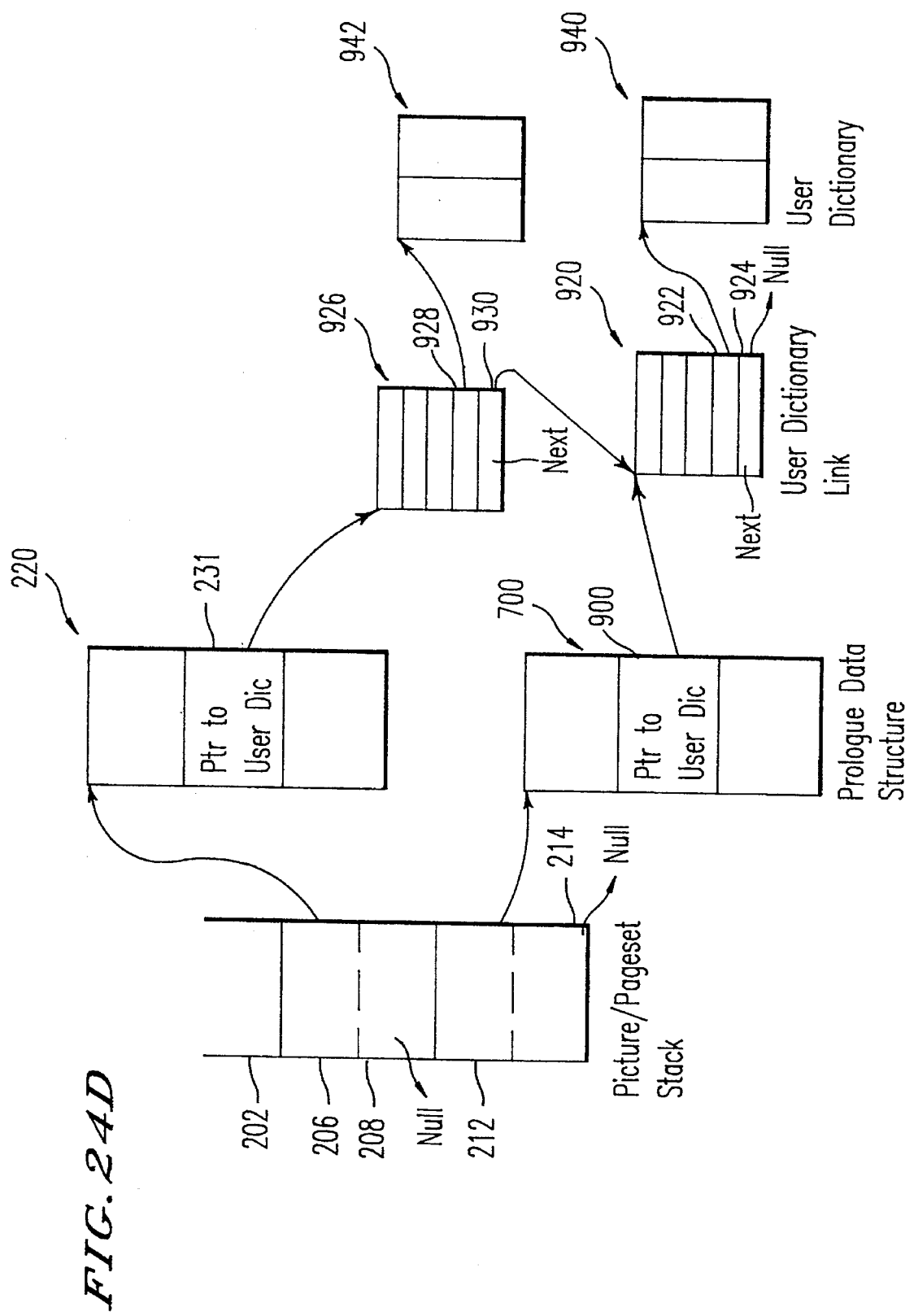

At the end of the processing of tokensequence 68, the CCI data structure 240 is destroyed and the pointer to user dictionary link 252 is copied to the pointer to user dictionary link 231 of prologue data structure 220. The resulting data structures are illustrated in FIG. 24D. The search order of the user dictionaries for the second hierarchical levels of both FIGS. 24C and 24D would be dictionary 942 and then dictionary 940.

Figure 24E:
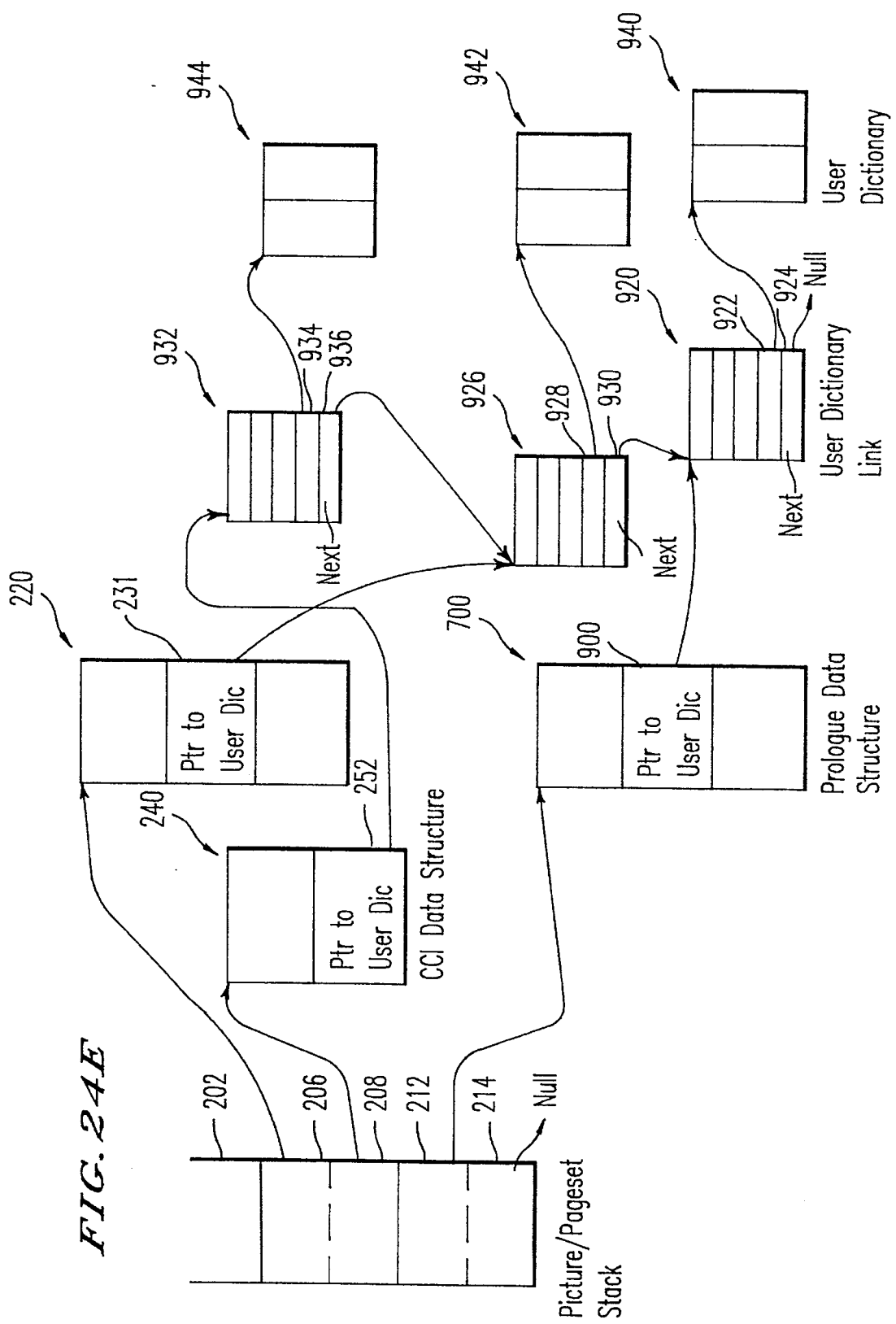

It is possible for additional entries and modifications to be made to the user dictionary after setup procedure 67. For example, tokensequence 70 can write additional entries into the user dictionary. As tokensequence 70 is being processed, CCI data structure 240 illustrated in FIG. 24E is created. When the portion of tokensequence 70 containing the additional entries to the user dictionary is encountered, the user dictionary link structure 932 is created. User dictionary 932 points to a newly created portion of the user dictionary 944 and has its "next" pointer point to the user dictionary link structure 926.

Figure 25:
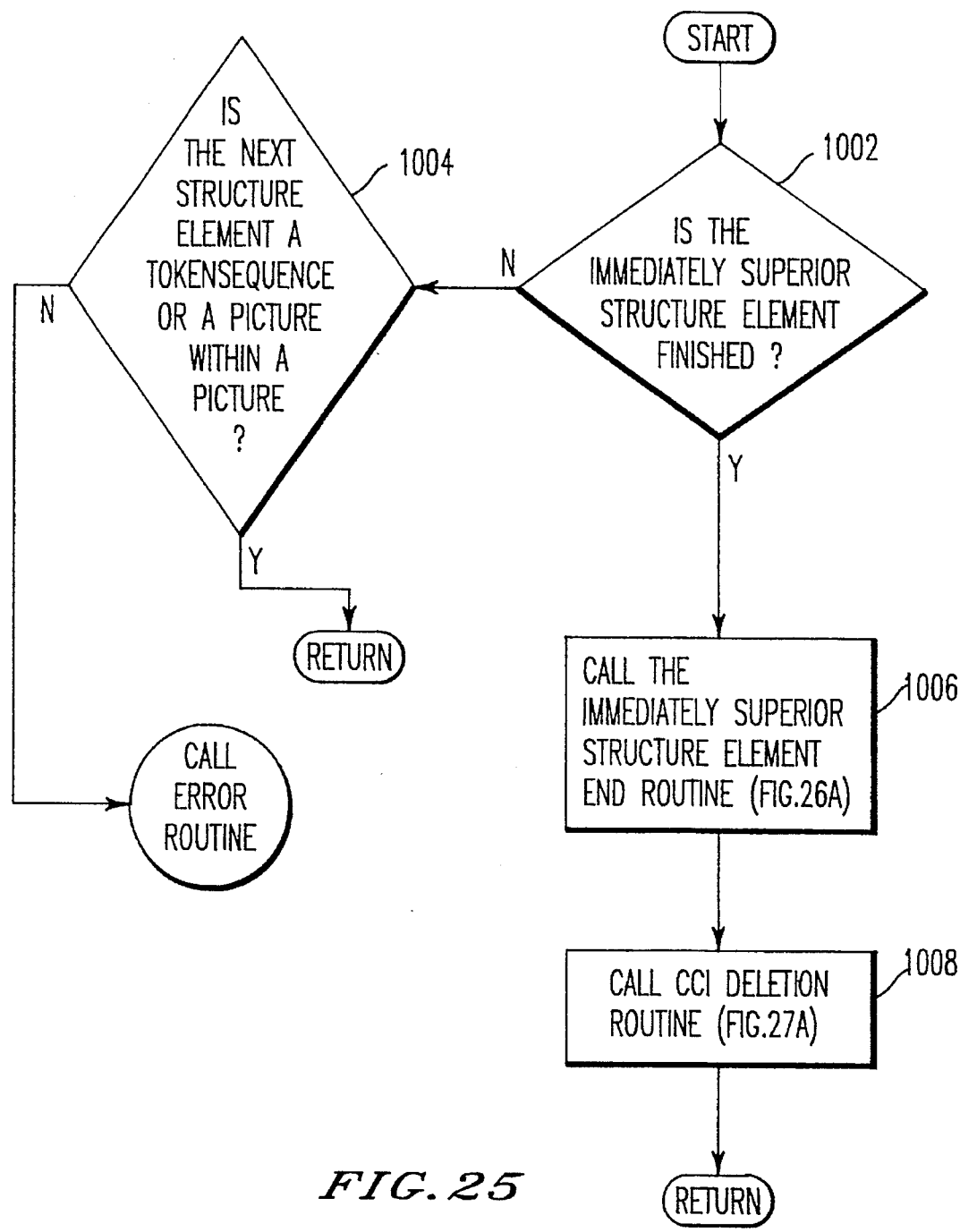
FIG. 25 illustrates a process used when the end of a tokensequence element is encountered.

FIGS. 25–27B illustrate the procedure used when a tokensequence element has ended. When a tokensequence element ends, the process illustrated in FIG. 25 is called and step 1002 determines if the immediately superior structure element has finished. If the immediately superior structure element has finished, the CCI data structure should be deleted by calling the processes described in steps 1006 and 1008. If the immediately superior structure element has not finished, step 1004 determines if the next structure element is a tokensequence or a picture within a picture or pageset.

When a tokensequence ends, there can be another tokensequence immediately following. This could occur, for example, if there was two tokensequences under the setup procedure 67 of FIG. 4. One tokensequence could modify the state variables and another tokensequence, for example a tokensequence at position 68.5, could modify the user dictionary. Therefore, upon encountering tokensequence 68.5 (not illustrated), the CCI data structure of tokensequence 68 should not be deleted.

When picture 71 is encountered, the CCI data structure of tokensequence 70 should not be deleted as the CCI data structure created upon processing token 670 is necessary for processing tokensequence 74. This is a picture which is within a picture or pageset and therefore, the error routine should not be called but flow should return to the structure processor. Note that when picture 71 is encountered, step 1002 will determine that the immediately superior structure element, the picture body 69, has not ended and flow will proceed to step 1004.

The process called by step 1006 copies the necessary values which need to be used at a later time. The process called by step 1008 deletes the date structures which are no longer necessary.

Figure 26A:
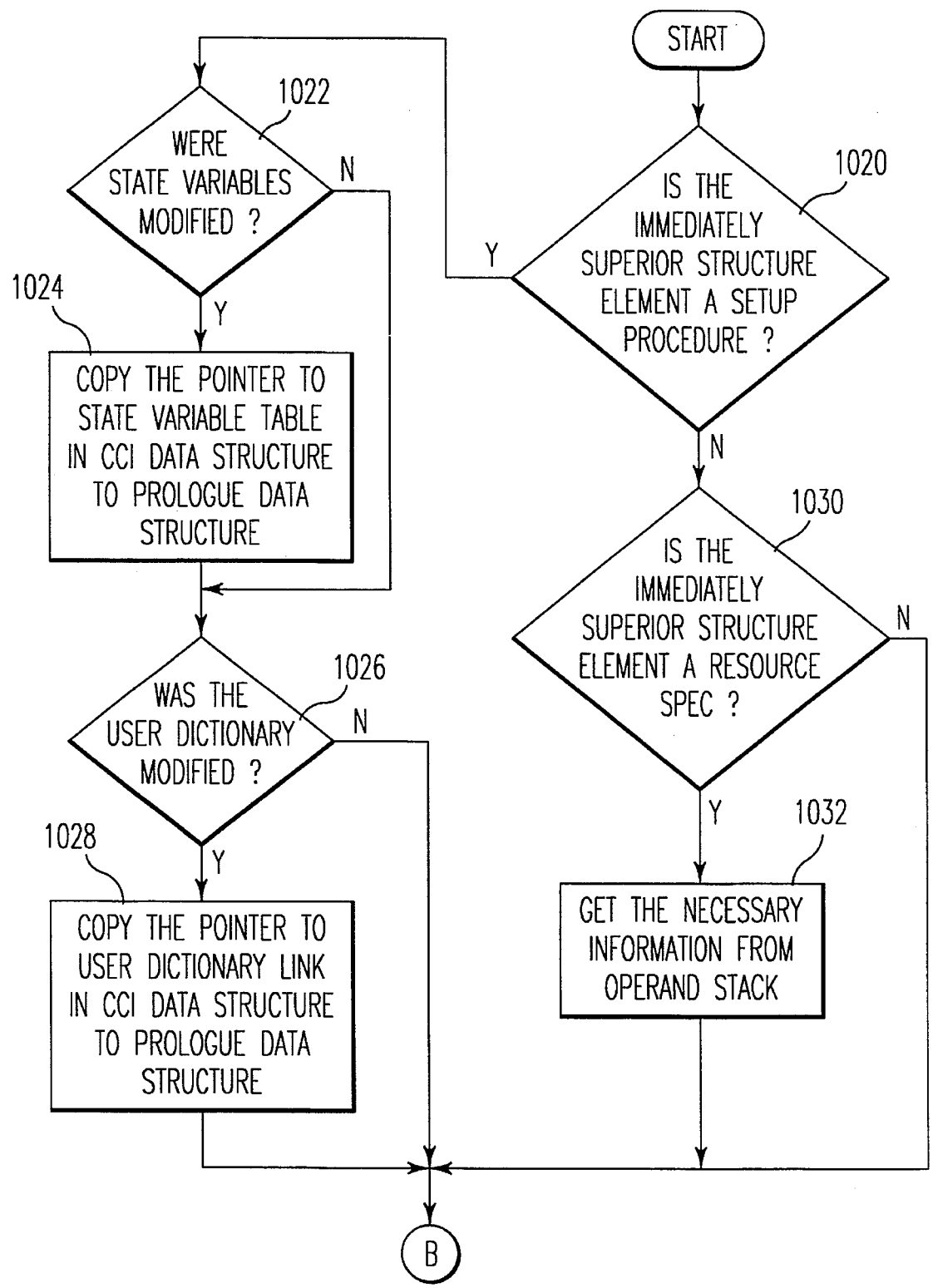
FIGS. 26A and 26B illustrate a process to save the necessary variables before a CCI data structure is deleted.
Figure 26B:
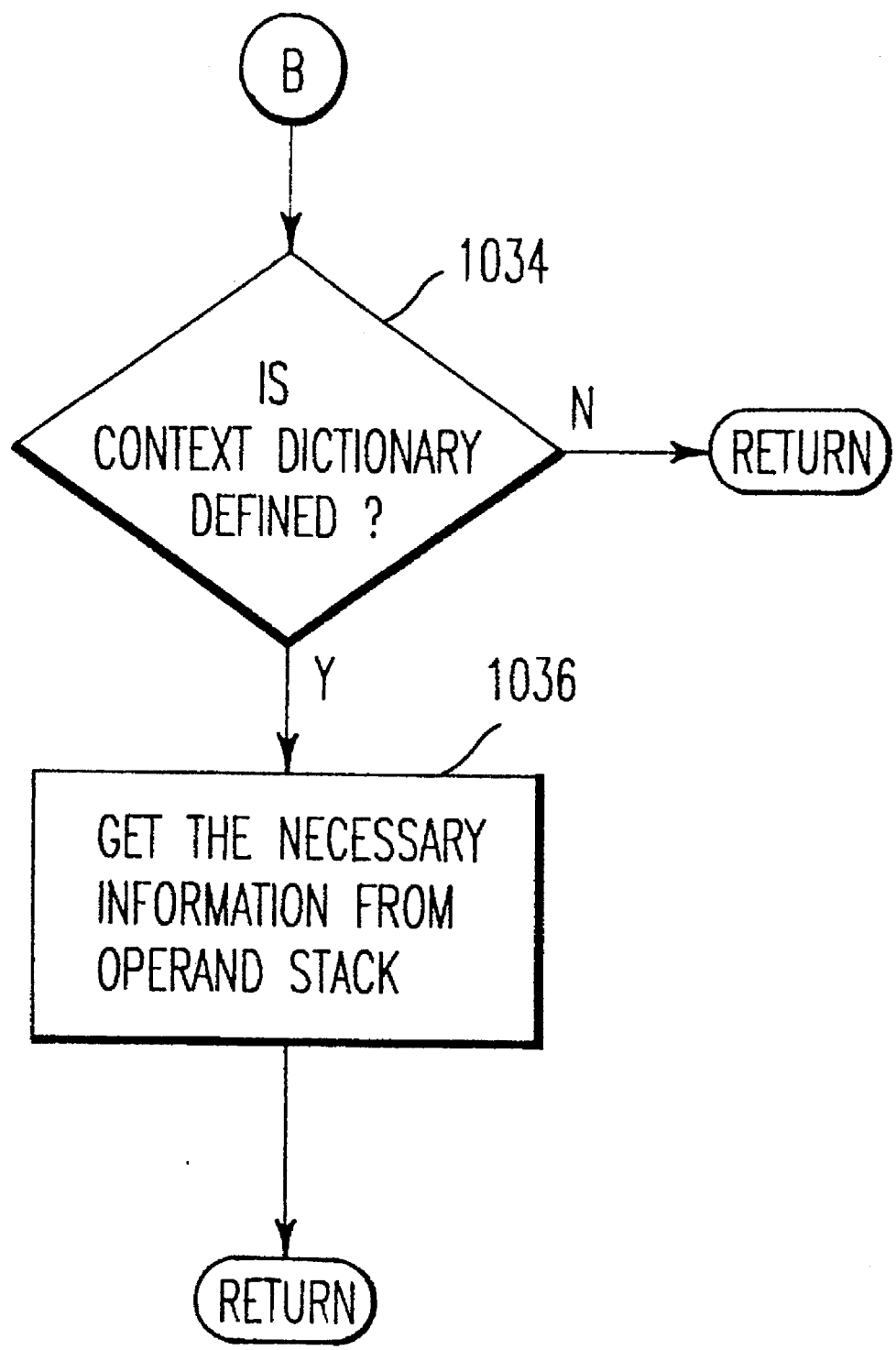

Step 1006 calls the process illustrated in FIGS. 26A and 26B. Under certain processing conditions, the CCI data structure is used as a temporary storage area of data and when the tokensequence(s) which cause the creation of the CCI data structure end, the CCI data structure can be deleted. However, to modify certain parameters used when processing a document for presentation, it is necessary to store the parameters once they are modified. Therefore, under certain circumstances, certain pointers from the CCI data structure are copied to the corresponding entry in the prologue data structure before the CCI data structure is deleted.

After step 1006 calls the process illustrated in FIG. 26A, step 1020 determines if the immediately superior structure element is a setup procedure. A setup procedure can be used to modify state variables or the user dictionary for future processing. Therefore, it is necessary to copy these modifications to the pointers in the prologue data structure. If the immediately superior structure element is a setup procedure, flow proceeds to step 1022 which determines if state variables were modified. If they were, the pointer to the state variable table in the CCI data structure is copied to the corresponding pointer in the prologue data structure by step 1024. Next, step 1026 determines if the user dictionary was modified. If it was, it is necessary to copy the pointer to the user dictionary link which is in the CCI data structure to the corresponding pointer in the prologue data structure in step 1028. Then, flow proceeds to B illustrated in FIG. 26B.

If step 1020 determines that the immediately superior structure element is not a setup procedure, flow proceeds to step 1030 which determines if the immediately superior element is a resource specification. If it is a resource specification, step 1032 saves the necessary information from the operand stack. For example, in the case of a color resource specification, a vector reference on the top of the operand stack must be saved by structure processor. In cases of pattern and form resource specifications, the dictionary reference is saved. The flow then proceeds to process B illustrated in FIG. 26B.

Step 1034 examines if any context dictionaries are defined. If they are, step 1036 gets the dictionary reference from the operand stack. The flow then returns to the process illustrated in FIG. 25 and step 1008 calls the CCI deletion routine illustrated in FIGS. 27A and 27B which deletes the data structures which are no longer necessary.

Figure 27A:
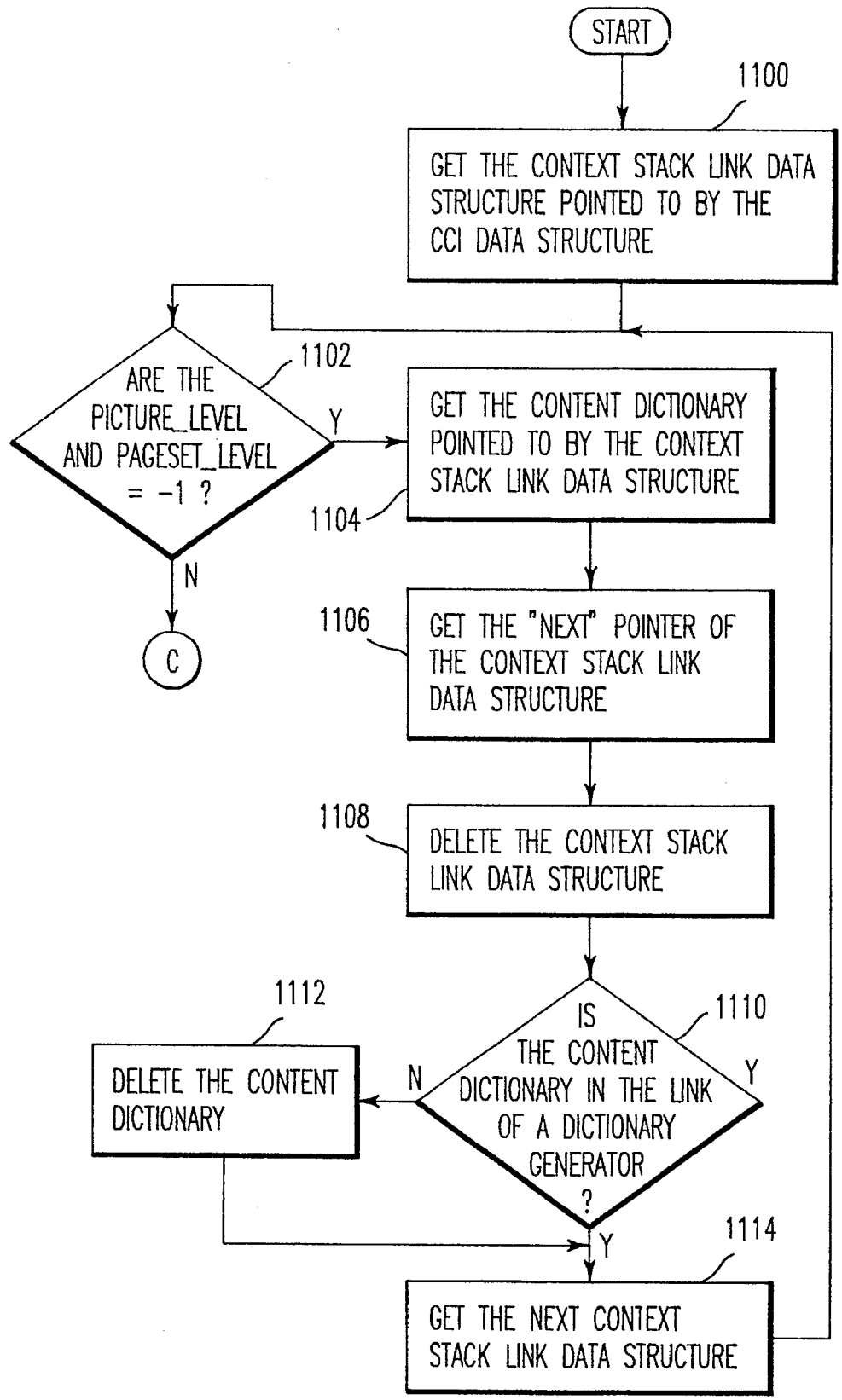
FIGS. 27A and 27B illustrate a process to delete unnecessary CCI data structures and data structure related to the CCI data structures.

In FIG. 27A, step 1100 gets the context stack link data structure pointed to by the CCI data structure. Step 1102 determines if the PICTURE_LEVEL and PAGESET_LEVEL are both equal to −1. If they are equal to −1, dictionary manipulation has occurred by a tokensequence element and therefore, the context stack link data structure is not pointed to by any other CCI data structure or prologue data structure and it can be deleted. Step 1104 gets the dictionary pointed to by the context stack link data structure. Step 1106 stores the "NEXT" pointer of the context stack link data structure. Step 1108 then deletes the context stack link data structure. Step 1110 determines if the dictionary is in the link of a dictionary generator. If it is not, the dictionary can be erased in step 1112. Flow then proceeds to step 1114 where the next context stack link data structure is obtained using the information obtained in step 1106. When a context link data structure is obtained which does not have the PICTURE_LEVEL and PAGESET_LEVEL equal to −1, flow proceeds to process C illustrated in FIG. 27B.

Figure 27B:
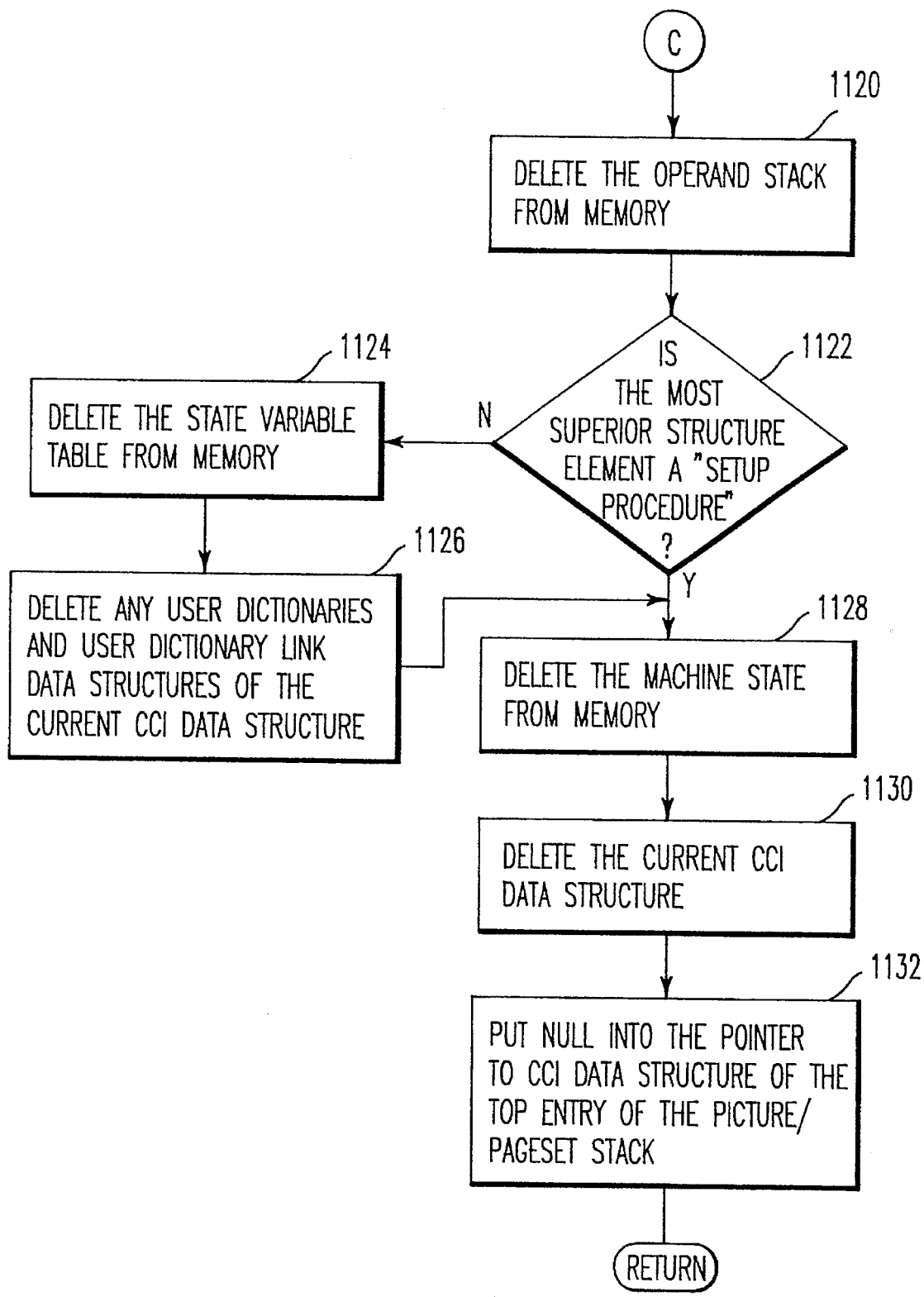

In the process illustrated in FIG. 27B, step 1120 deletes the operand stack from memory as it is no longer used. Step 1122 then determines if the most superior structure element is a setup procedure. If it is not a setup procedure, the state variable table can be deleted from memory by step 1124 and the user dictionaries and user dictionary link structures of the CCI data structure are deleted by step 1126.

Step 1128 deletes the machine state from memory, step 1130 deletes CCI data structure, and step 1132 puts null into the pointer to the CCI data structure of the top entry of the picture/pageset stack. Flow then returns to the process illustrated in FIG. 25 and subsequently returns to the structure processor which called the processor illustrated in FIG. 25.

A description of the manipulation of state variables by setup procedure 58 and its associated tokensequence 59, illustrated in FIG. 4, will be discussed with reference to the data structures illustrated in FIG. 28A–28E.

Figure 28A:
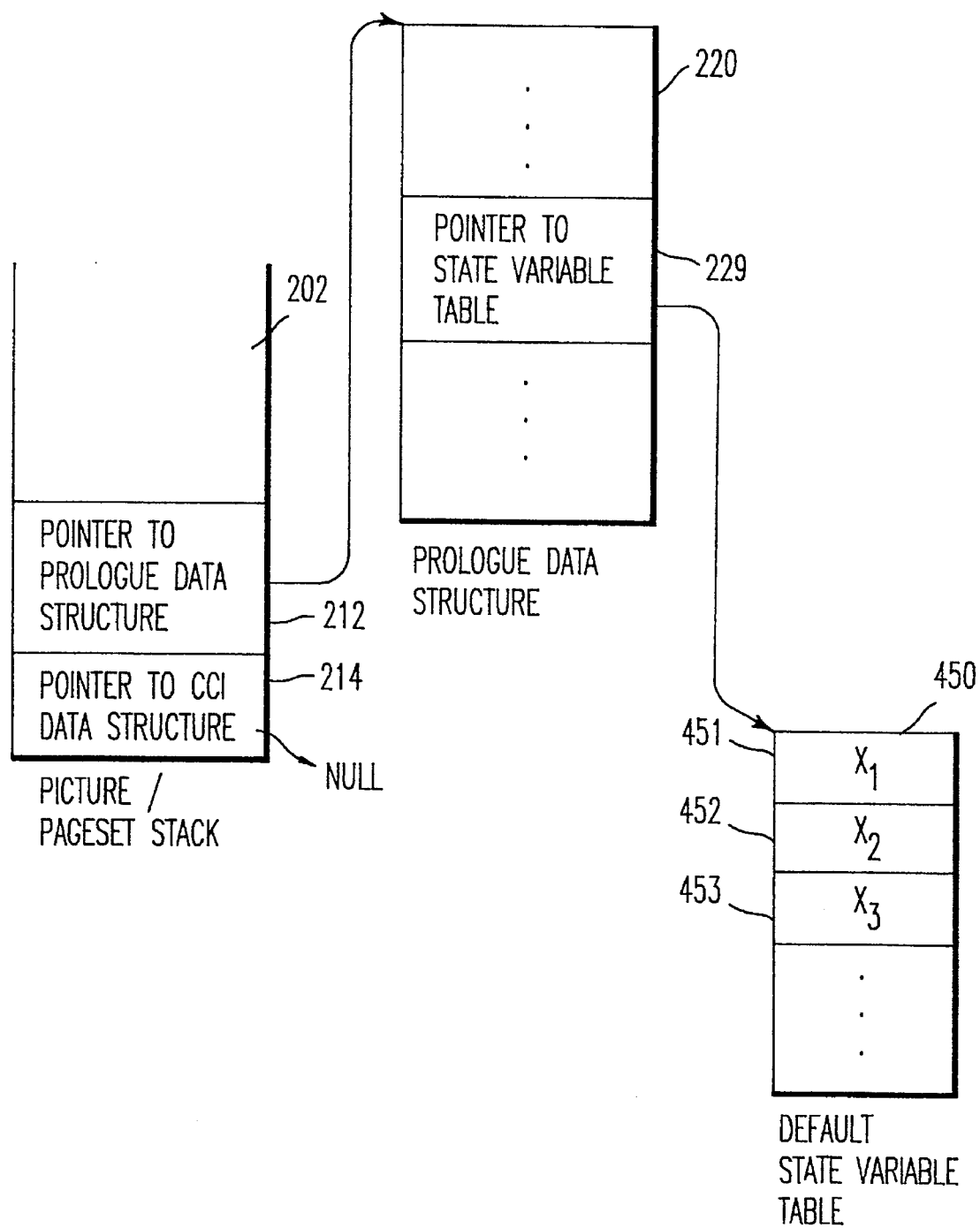
FIGS. 28A–28E illustrate data structures used during the processing of state variables.

FIG. 28A illustrates the picture/pageset stack 202, the prologue data structure 220 and default state variable 450 at the beginning of the setup procedure structure element 58. The default state variable 1200 contains the default state variables. The default state variables are likely to be stored in a nonvolatile memory such as a ROM or a disk storage device. Therefore, it may be impossible to change the values in the default state variable table as it may be read only. Although there are three tokensequences (53, 55, and 57) prior to the setup procedure 58, those tokensequences only change the variables in a state variable table which is pointed to by the CCI data structure created as each of the three tokensequence 53, 55 and 57 are being processed. However, the changes to those state variable changes are temporary and not stored.

Figure 28B:
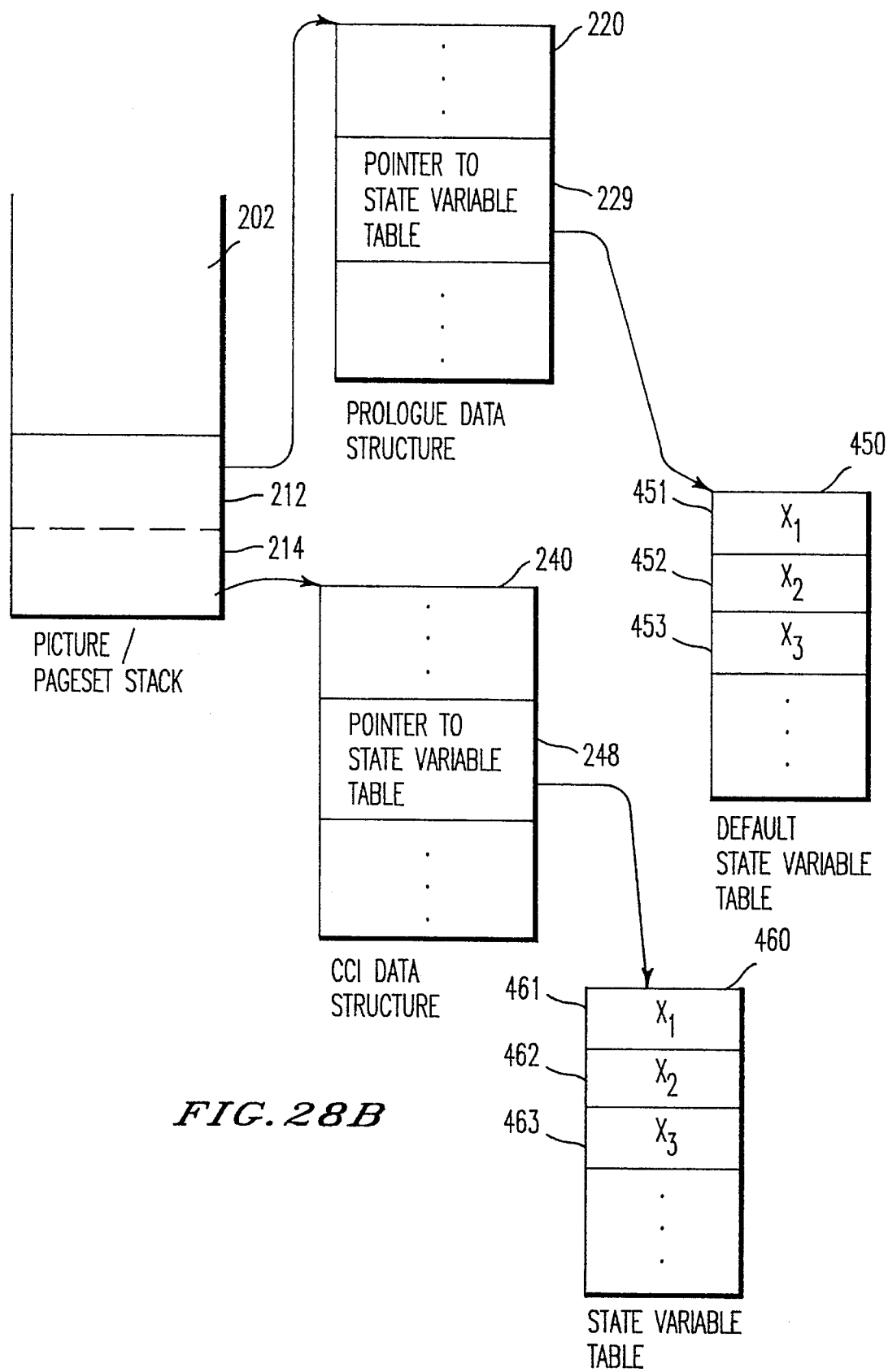

At the beginning of tokensequence 59, a CCI data structure 240 is allocated, as set forth in step 604 of FIG. 28A. In step 606, the pointer to the newly created CCI data structure 240 is stored in the pointer 214 to the CCI data structure of the top entry of the picture/pageset stack 202. In step 608, a state variable table 460 is created and its pointer is stored in the pointer to state variable table 248 of the CCI data structure 420. In step 610, the values of the state variable table 450 pointed to by the pointer to the state variable table 229 in the prologue data structure 220 are copied into the newly created state variable table 460. For example, the values X1, X2 and X3 in the entries 451, 452, and 453 of the default state variable table 450 are copied to the entries 461, 462, and 463 respectively of the state variable table 460. The data structures are now as illustrated in FIG. 28B.

During the processing of the tokensequence 59, the state variables of the state variable table 460 may be modified. For example, the following tokensequence modifies the state variable tables Current_Position and Current_Stroke_Width:

10 10 moveto 10 setlinewidth

Figure 28C:
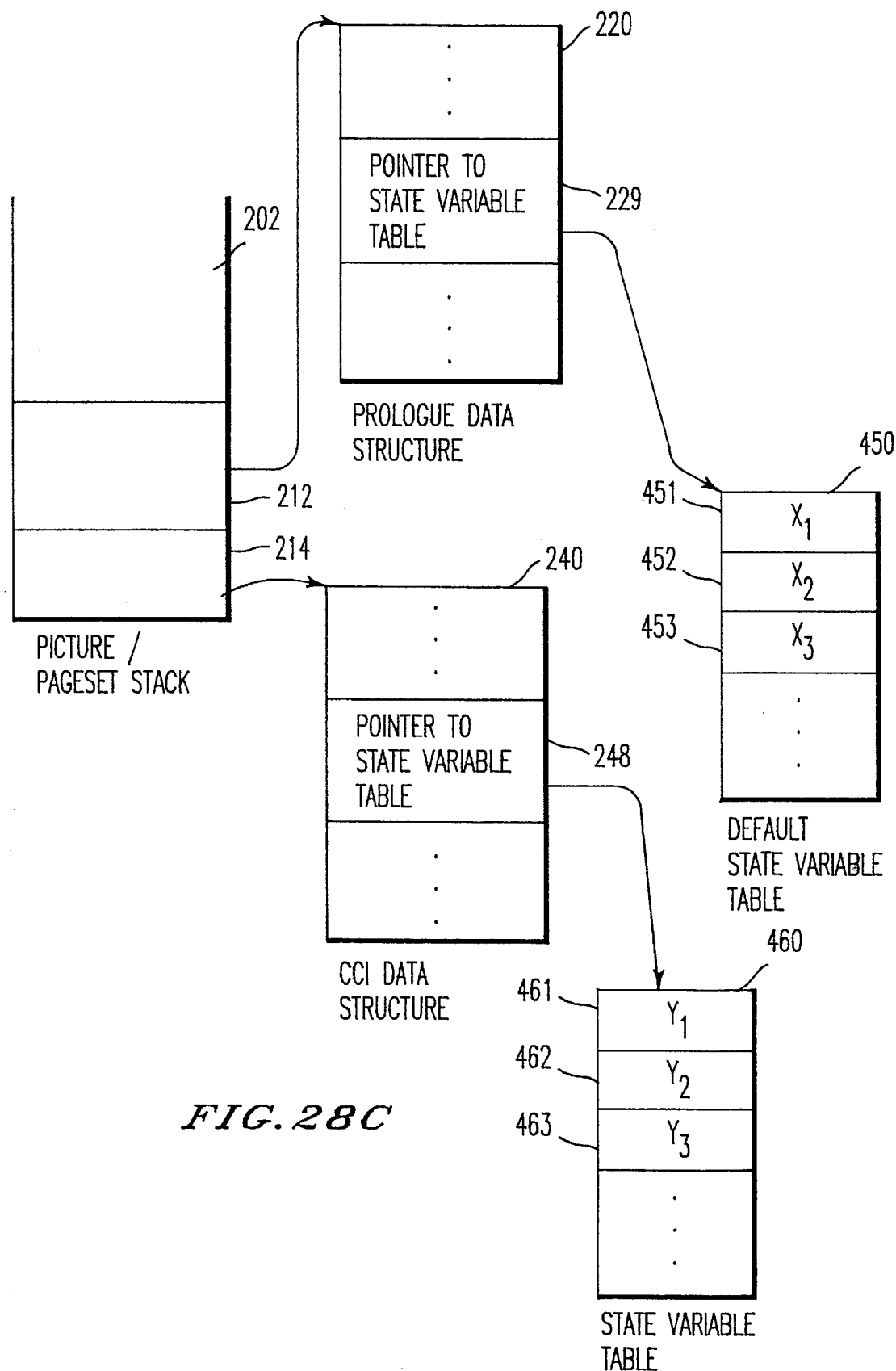

FIG. 28C illustrates the condition of the data structures after the state variables are modified.

Figure 28D:
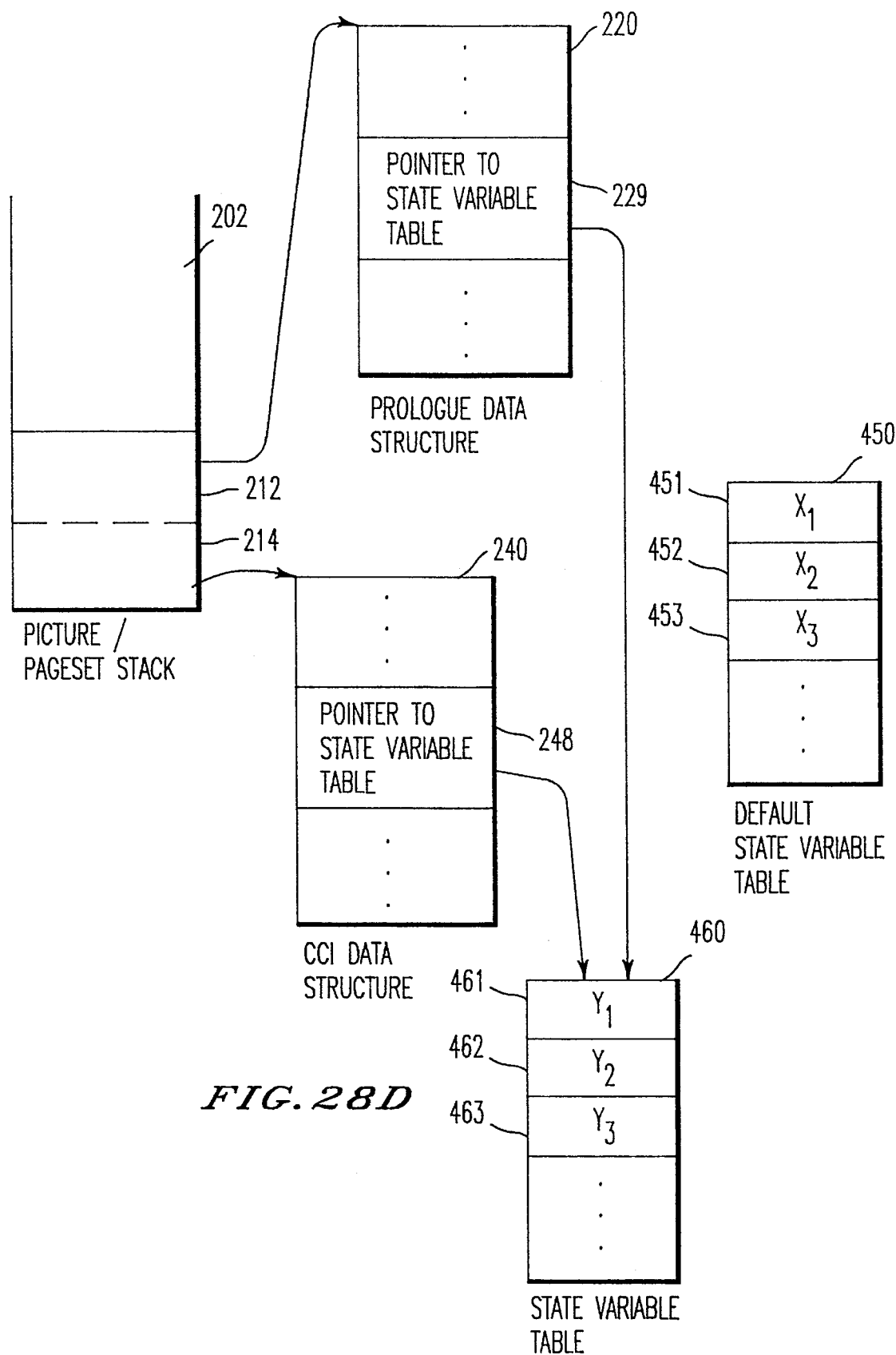

FIG. 28D illustrates the data structures when the content processor finishes processing the tokensequence 59 and the structure processor takes control at the end of the setup procedure 58. The structure processor copies the pointer to state variable table 248 of the CCI data structure 240 to the pointer to state variable table 229 of the prologue data structure 220, as described in step 1024 of FIG. 26A. Therefore, the state variables have been effectively modified and the future processing will use the pointer to state variable table 229 which points to a state variable table 260 having modified values 461, 462 and 463.

Figure 28E:
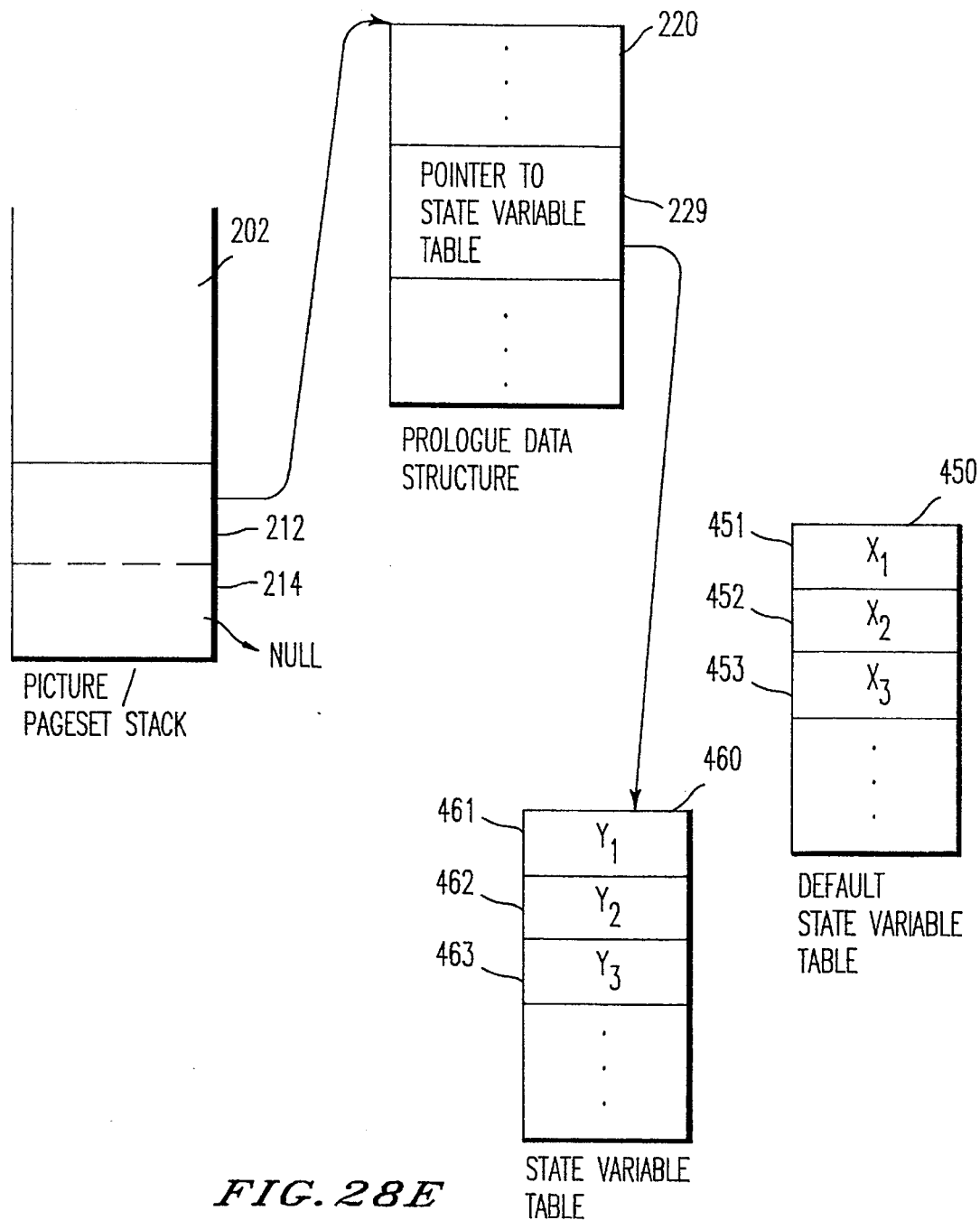

FIG. 28E shows the data structures after the setup procedure is finished. The CCI data structure is deleted from memory as described in the Step 1130 of FIG. 27B and the pointer to the CCI data structure of the picture/pageset stack 202 is set to point to null as described in step 1132 of FIG. 27B.

The Structure Processor may push some value to the operand stack before passing control to the Context Processor. For example, when the color is defined in a Resource Definition structure element, the Structure Processor may push a single element of type Identifier whose value depends on the value of the Color Name. Similarly, when the Dictionary Generator structure element is processed, the Structure Processor must push a dictionary reference on the operand stack before passing control to the Content Processor. Therefore, different values are pushed onto the operand stack depending on the superior structure element to the tokensequence.

Obviously, numerous modifications and variations of the present invention are possible in light of the above teachings. For example, the picture/pageset stack can have only one entry for each hierarchical level. This entry could point to the prologue data structure for the hierarchical level. The prologue data structure would then have a pointer to a current context of interpretation data structure for the hierarchical level. This arrangement would achieve equivalent results as was described above as both a prologue data structure and CCI data structure would be implemented. Also, it may not be necessary to have the pointer to resource declaration in the CCI data structure. It is therefore to be understood that within the scope of the appended claims, the invention may be practiced otherwise than as specifically described herein.

What is claimed as new and desired to be secured by Letters Patent of the United States is:

1. A computer implemented method for processing a hierarchically structured document, comprising the steps of:

creating a first data structure having a first set of information;

creating a first reference to the first data structure, said first reference to the first data structure being associated with a structure portion of a predetermined hierarchical level of the document;

creating, for said predetermined hierarchical level of the document when a content portion of said predetermined hierarchical level is processed, a second data structure which has a second reference thereto and copying the first set of information to a second set of information of the second data structure;

processing said content portion of said predetermined hierarchical level using the second reference to said second set of information;

determining if processing of content for said predetermined hierarchical level is finished;

processing a structure portion of a first subsequent hierarchical level, wherein said first subsequent hierarchical level is lower in the hierarchical structure of the document than the predetermined hierarchical level;

copying the first reference to a third reference associated with the structure portion of the first subsequent hierarchical level;

processing a structure portion of a second subsequent hierarchical level, wherein said second subsequent hierarchical level is lower in the hierarchical structure of the document than the first subsequent hierarchical level;

creating, for said second subsequent hierarchical level of the document when a content portion of said second subsequent hierarchical level is processed, a third data structure referenced by a fourth reference and copying the set of information referred to by the third reference to a third set of information of the third data structure;

processing said content portion of said second subsequent hierarchical level using said third set of information;

determining if processing of said content portion of said second subsequent hierarchical level is finished; and copying the fourth reference to the third reference, when said processing of said content portion of said second subsequent hierarchical level is determined to be finished.

2. The method according to claim 1, further comprising the step of:

creating an entry in a stack for the predetermined hierarchical and the first subsequent hierarchical levels of the document, each entry in the stack including a reference to a set of references corresponding to structure of a corresponding hierarchical level and used during processing of the corresponding hierarchical level, and including a reference to a set of references corresponding to content of a corresponding hierarchical level and used during processing of a content portion of the corresponding hierarchical level.

3. A method according to claim 1, wherein said hierarchically structured document is a document which conforms to rules of a Standard Page Description Language.

4. A method according to claim 1, wherein:

said step of copying the fourth reference to the third reference copies a reference which is one of a reference to a state variable table and a reference to a dictionary which includes key-value pairs.

5. A computer implemented method for processing a hierarchically structured document, comprising the steps of:

creating a first data structure having a first set of information;

creating a first reference to the first data structure, said first reference to the first data structure being associated with a structure portion of a predetermined hierarchical level of the document;

creating, for said predetermined hierarchical level of the document when a content portion of said predetermined hierarchical level is processed, a second data structure having a second reference thereto and copying the first set of information to a second set of information of the second data structure;

processing a structure portion of a subsequent hierarchical level, wherein said subsequent hierarchical level is lower in the hierarchical structure of the document than the predetermined hierarchical level;

determining if processing of content for said predetermined hierarchical level is in process;

copying the second reference to a third reference associated with structure of the subsequent hierarchical level, when said processing of content for said predetermined hierarchical level is determined to be in process;

copying the first reference to the first data structure to the third reference associated with the structure of the subsequent hierarchical level, when said processing of content for said predetermined hierarchical level is determined not to be in process;

creating, for said subsequent hierarchical level of the document when a content portion of said subsequent hierarchical level is processed, a third data structure referenced by a fourth reference and copying the set of information referred to by the third reference to a third set of information of the third data structure; and processing said content portion of said subsequent hierarchical level using said third set of information; and continuing processing of said content portion of said predetermined hierarchical level after processing of said content portion of said subsequent hierarchical level is complete, using said second reference to said second data structure containing said second set of information, when said processing of content for said predetermined hierarchical level is determined to be in process.

6. A method according to claim 5, wherein said hierarchically structured document is a document which conforms to rules of a Standard Page Description Language.

7. An apparatus for processing a hierarchically structured document, comprising:

means for creating a first data structure having a first set of information;

means for creating a first reference to the first data structure, said first reference to the first data structure being associated with a structure portion of a predetermined hierarchical level of the document;

means for creating, for said predetermined hierarchical level of the document when a content portion of said predetermined hierarchical level is processed, a second data structure which has a second reference thereto and copying the first set of information to a second set of information of the second data structure;

means for processing said content portion of said predetermined hierarchical level using the second reference to said second set of information;

means for determining if processing of content for said predetermined hierarchical level is finished;

means for processing a structure portion of a first subsequent hierarchical level, wherein said first subsequent hierarchical level is lower in the hierarchical structure of the document than the predetermined hierarchical level;

means for copying the first reference to a third reference associated with the structure portion of the first subsequent hierarchical level;

means for processing a structure portion of a second subsequent hierarchical level, wherein said second subsequent hierarchical level is lower in the hierarchical structure of the document than the first subsequent hierarchical level;

means for creating, for said second subsequent hierarchical level of the document when a content portion of said second subsequent hierarchical level is processed, a third data structure referenced by a fourth reference and copying the set of information referred to by the third reference to a third set of information of the third data structure;

means for processing said content portion of said second subsequent hierarchical level using said third set of information;

means for determining if processing of said content portion of said second subsequent hierarchical level is finished; and means for copying the fourth reference to the third reference, when said processing of said content portion of said second subsequent hierarchical level is determined to be finished.

8. The apparatus according to claim 7, further comprising:

means for creating an entry in a stack for the predetermined and the first subsequent hierarchical levels of the document, each entry in the stack including a reference to a set of references corresponding to structure of a corresponding hierarchical level and used during processing of the corresponding hierarchical level, and including a reference to a set of references corresponding to content of a corresponding hierarchical level and used during processing of a content portion of the corresponding hierarchical level.

9. The apparatus according to claim 7, wherein said hierarchically structured document is a document which conforms to rules of a Standard Page Description Language.

10. The apparatus according to claim 7, wherein:

said means for copying the fourth reference to the third reference copies a reference which is one of a reference to a state variable table and a reference to a dictionary which includes key-value pairs.

11. An apparatus for processing a hierarchically structured document, comprising:

means for creating a first data structure having a first set of information;

means for creating a first reference to the first data structure, said first reference to the first data structure being associated with a structure portion of a predetermined hierarchical level of the document;

means for creating, for said predetermined hierarchical level of the document when a content portion of said predetermined hierarchical level is processed, a second data structure having a second reference thereto and copying the first set of information to a second set of information of the second data structure;

means for processing a structure portion of a subsequent hierarchical level, wherein said subsequent hierarchical level is lower in the hierarchical structure of the document than the predetermined hierarchical level;

means for determining if processing of content for said predetermined hierarchical level is in process;

means for copying the second reference to a third reference associated with structure of the subsequent hierarchical level, when said processing of content for said predetermined hierarchical level is determined to be in process;

means for copying the first reference to the first data structure to the third reference associated with the structure of the subsequent hierarchical level, when said processing of content for said predetermined hierarchical level is determined not to be in process;

means for creating, for said subsequent hierarchical level of the document when a content portion of said subsequent hierarchical level is processed, a third data structure referenced by a fourth reference and copying the set of information referred to by the third reference to a third set of information of the third data structure;

means for processing said content portion of said subsequent hierarchical level using said third set of information; and means for continuing processing of said content portion of said predetermined hierarchical level after processing of said content portion of said subsequent hierarchical level is complete, using said second reference to said second data structure containing said second set of information, when said processing of content for said predetermined hierarchical level is determined to be in process.

12. The apparatus according to claim 11, wherein said hierarchically structured document is a document which conforms to rules of a Standard Page Description Language.

* * * * *